US009125427B2

(12) United States Patent
Dull et al.

(10) Patent No.: US 9,125,427 B2
(45) Date of Patent: Sep. 8, 2015

(54) METHOD FOR SANITIZING FRESH PRODUCE

(71) Applicant: Dole Fresh Vegetables, Inc., Salinas, CA (US)

(72) Inventors: Bob J. Dull, Akron, OH (US); Roger Dale Billingsley, Laguna Niguel (CA); Abizer Moiz Khairullah, Morgan Hill, CA (US); Amanda Jane Deering, Lafayette, IN (US); Jessica Okane Kawabata, Salinas, CA (US); Jonna Marie Thomas, Hollister, CA (US)

(73) Assignee: Dole Fresh Vegetables, Inc., Westlake Village, CA (US)

( * ) Notice: Subject to any disclaimer, the term of this patent is extended or adjusted under 35 U.S.C. 154(b) by 0 days.

(21) Appl. No.: 13/915,594

(22) Filed: Jun. 11, 2013

(65) Prior Publication Data
US 2014/0196751 A1 Jul. 17, 2014

Related U.S. Application Data

(60) Provisional application No. 61/752,663, filed on Jan. 15, 2013.

(51) Int. Cl.
*B08B 3/00* (2006.01)
*A23L 1/015* (2006.01)
(Continued)

(52) U.S. Cl.
CPC ............... *A23L 1/0157* (2013.01); *A23B 7/157* (2013.01); *A23L 1/0011* (2013.01); *A23B 7/153* (2013.01); *A23B 9/24* (2013.01); *A23L 3/3454* (2013.01); *B08B 3/00* (2013.01); *B08B 3/04* (2013.01)

(58) Field of Classification Search
CPC ............ B08B 3/00; B08B 3/04; A23B 7/153; A23B 9/24; A23L 3/3454
USPC ......... 426/335, 532, 506; 134/1, 25.3, 26, 28, 134/29, 34, 36, 42; 510/108, 111
See application file for complete search history.

(56) References Cited

U.S. PATENT DOCUMENTS

2002/0072288 A1 6/2002 Hei et al.
2002/0086903 A1 7/2002 Giambrone et al.
(Continued)

FOREIGN PATENT DOCUMENTS

WO 01/87358 A1 11/2001
WO 02/35933 A1 5/2002
WO 2011/038168 A1 3/2011

OTHER PUBLICATIONS

Dai et al., "Efficacy of Different Sanitizing Agents and Their Combination on Microbe Population and Quality of Fresh-Cut Chinese Chives", Journal of Food Science, vol. 77, No. 7, 2012, pp. M348-M353.
(Continued)

Primary Examiner — Bibi Carrillo
(74) Attorney, Agent, or Firm — Morrison & Foerster LLP

(57) ABSTRACT

A method for sanitizing produce, by: treating the produce with a chlorine dioxide solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

12 Claims, 13 Drawing Sheets

(51) Int. Cl.
    A23L 1/00      (2006.01)
    A23B 7/157     (2006.01)
    B08B 3/04      (2006.01)
    A23B 7/153     (2006.01)
    A23L 3/3454    (2006.01)
    A23B 9/24      (2006.01)

(56) References Cited

U.S. PATENT DOCUMENTS

| | | |
|---|---|---|
| 2002/0192340 A1 | 12/2002 | Swart et al. |
| 2004/0009094 A1 | 1/2004 | Adiga et al. |
| 2004/0115322 A1 | 6/2004 | Osborn |
| 2006/0008494 A1 | 1/2006 | Prusiner |
| 2007/0163966 A1 | 7/2007 | Hilgren et al. |
| 2008/0241269 A1 | 10/2008 | Velasquez |
| 2009/0196959 A1 | 8/2009 | Guzman |
| 2010/0303671 A1 | 12/2010 | Bertrand |
| 2012/0070549 A1* | 3/2012 | Gutzmann et al. ............ 426/281 |

OTHER PUBLICATIONS

Lin et al., "Inactivation of *Escherichia coli* 0157:H7, *Salmonella enterica* Serotype Enteritidis, and *Listeria monocytogenes* on Lettuce by Hydrogen Peroxide and Lactic Acid and by Hydrogen Peroxide with Mild Hear", Journal of Food Protection, vol. 65, No. 8, 2002, pp. 1215-1220.

Vandekinderen et al., "Moderate and High Doses of Sodium Hypochlorite, Neutral Electrolyzed Oxidizing Water, Peroxyacetic Acid, and Gaseous Chlorine Dioxide Did Not Affect the Nutritional and Sensory Qualities of Fresh-Cut Iceberg Lettuce (*Lactuca sativa* Var. *capitata* L) after Washing", Journal of Agricultural and Food Chemistry, vol. 57, No. 10, 2009, pp. 4195-4203.

International Search Report and Written Opinion received for PCT Patent Application No. PCT/US2013/45275, mailed on Nov. 15, 2013, 13 pages.

* cited by examiner

| Date | Treatment | Lab/Comm-ercial | Wash 1 | | Wash 2 | | Wash 3 | | Initial Micro | Micro Red | Micro Red to Control |
|---|---|---|---|---|---|---|---|---|---|---|---|
| | | | Temp, F | Chemical = 20 s | Temp, C | Chemical = 90 s | Temp, C | Chemical = 30 s | | | |
| 1/15/2013 | Control | Lab | 39 | Chlorine = 40 - 60 ppm | 104 | Chlorine = 40 - 60 ppm | 39 | Chlorine = 40 - 60 ppm | | | |
| | Treat 1 | Lab | 39 | ClO2 = 5 ppm | 104 | Chlorine = 40 - 60 ppm | 39 | PAA = 60 - 70 ppm | | | 2.1 |
| | Treat 2 | Lab | 39 | ClO2 = 10 ppm | 104 | Chlorine = 40 - 60 ppm | 39 | PAA = 60 - 70 ppm | | | 0.77 |
| | Treat 3 | Lab | 39 | ClO2 = 20 ppm | 104 | Chlorine = 40 - 60 ppm | 39 | PAA = 60 - 70 ppm | | | 1.2 |
| 3/8/2013 | Control | Lab | 39 | Chlorine = 40 - 60 ppm | 104 | Chlorine = 40 - 60 ppm | 39 | Chlorine = 40 - 60 ppm | | | |
| | Treat 1 | Lab | 39 | ClO2 = 5 ppm | 104 | Chlorine = 40 - 60 ppm | 39 | PAA = 60 - 70 ppm | | | 1.4 |
| 3/8/2013 | Control | Lab | 39 | Chlorine = 40 - 60 ppm | 104 | Chlorine = 40 - 60 ppm | 39 | Chlorine = 40 - 60 ppm | | | |
| | Treat 1 | Lab | 39 | Chlorine = 40 - 60 ppm | 104 | Chlorine = 40 - 60 ppm ClO2 = 5 ppm | 39 | PAA = 60 - 70 ppm | | | 0.8 |
| | Treat 2 | Lab | 39 | Chlorine = 40 - 60 ppm | 104 | Chlorine = 40 - 60 ppm ClO2 = 10 ppm | 39 | PAA = 60 - 70 ppm | | | 0.8 |
| | Treat 3 | Lab | 39 | Chlorine = 40 - 60 ppm | 104 | Chlorine = 40 - 60 ppm ClO2 = 20 ppm | 39 | PAA = 60 - 70 ppm | | | 0.27 |
| 3/8/2013 | Control | Lab | 39 | Chlorine = 40 - 60 ppm | 104 | Chlorine = 40 - 60 ppm | 39 | Chlorine = 40 - 60 ppm | | | |
| | Treat 1 | Lab | 39 | Chlorine = 40 - 60 ppm | 4 | Chlorine = 40 - 60 ppm ClO2 = 20 ppm | 39 | PAA = 60 - 70 ppm | | | 0 |

Figure 12

| Date | Type | | | | | | | | | | |
|---|---|---|---|---|---|---|---|---|---|---|---|
| 1/31/2013 | Control | Commercial | 65 | Chlorine = 20 - 30 ppm | 104 | Chlorine = 30 - 40 ppm | 39 | Chlorine = 40 - 60 ppm | 5.01 | 2.15 | |
| | Treat 1 | Commercial | 65 | Chlorine = 20 - 30 ppm | 104 | ClO2 = 3 ppm | 39 | Chlorine = 40 - 60 ppm | 5.18 | 2.16 | 0 |
| 3/5/2013 | Control | Commercial | 65 | Chlorine = 20 - 30 ppm | 104 | Chlorine = 30 - 40 ppm | 39 | Chlorine = 40 - 60 ppm | 5.08 | 1.62 | |
| | Treat 1 | Commercial | 65 | Chlorine = 20 - 30 ppm | 104 | Chlorine = 20 - 30 ppm ClO2 = 3-5 ppm | 39 | PAA = 50 - 70 ppm | 5.19 | 1.89 | 0.27 |
| 3/10/2013 | Control | Commercial | 65 | Chlorine = 20 - 30 ppm | 104 | Chlorine = 30 - 40 ppm | 39 | Chlorine = 40 - 60 ppm | 5.57 | 1.8 | |
| | Treat 1 | Commercial | 65 | Chlorine = 15 - 25 ppm ClO2 = 5-8 ppm | 104 | Chlorine = 30 - 40 ppm | 39 | PAA = 50 - 70 ppm | 5.63 | 2.07 | 0.27 |
| 3/24/2013 | Control | Commercial | 65 | Chlorine = 20 - 30 ppm | 104 | Chlorine = 30 - 40 ppm | 39 | Chlorine = 40 - 60 ppm | 5.09 | 2.14 | |
| | Treat 1 | Commercial | 65 | Chlorine = 20 - 30 ppm | 104 | Chlorine = 20 - 30 ppm ClO2 = 3-5 ppm | 39 | PAA = 50 - 70 ppm | 4.94 | 1.96 | -0.18 |
| 4/14/2013 | Control | Commercial | 65 | Chlorine = 20 - 30 ppm | 104 | Chlorine = 30 - 40 ppm | 39 | Chlorine = 40 - 60 ppm | 4.87 | 1.76 | |
| | Treat 1 | Commercial | 65 | Chlorine = 20 - 30 ppm | 69 | Chlorine = 30 - 40 ppm ClO2 = 9-12 ppm | 39 | PAA = 50 - 70 ppm | 4.93 | 1.67 | -0.09 |
| | Treat 2 | Commercial | 65 | Chlorine = 20 - 30 ppm ClO2 = 9-12 ppm | 69 | Chlorine = 30 - 40 ppm ClO2 = 9-12 ppm | 39 | PAA = 50 - 70 ppm | 4.78 | 2.07 | 0.26 |
| | Treat 3 | Commercial | 65 | Chlorine = 20 - 30 ppm ClO2 = 9-12 ppm | 104 | Chlorine = 30 - 40 ppm | 39 | PAA = 50 - 70 ppm | 4.61 | 1.8 | 0.04 |

Figure 12 (Cont.)

METHOD FOR SANITIZING FRESH PRODUCE

CROSS-REFERENCE TO RELATED APPLICATIONS

This application claims the benefit of U.S. Provisional Patent Application No. 61/752,663, filed Jan. 15, 2013, the disclosure of which is hereby incorporated by reference in its entirety.

FIELD

This application relates in general to sanitizing produce, such as leafy vegetables. More particularly, this application relates to a method for sanitizing produce using a combination of multiple sanitizing solutions to reduce bacterial contamination, reduce browning, and improve quality, resulting in longer marketable shelf-life.

BACKGROUND

The use of chlorine to sanitize freshly harvested produce (e.g., fruits and vegetables) has been well-described. Generally, chlorine is added to water as a gas to produce hypochlorite which is the active sanitizing agent. A use level of about 10 ppm and 100 ppm has been previously described as being effective for reducing microbial load and being effective against pathogens. However, while chlorine can be an effective sanitizing agent, chlorine alone has not been shown to be a completely effective kill step (i.e., a point in produce processing where potentially deadly pathogens are eradicated from the product, usually by killing the pathogen). Moreover, no single sanitizing agent has been shown to be a highly effective kill step.

The identification of a kill step in the sanitizing of fresh cut produce has remained elusive. Numerous methodologies have been described that claim additional microbial kill when compared to chlorine alone. In general, they either present additional problems or are not as effective as chlorine alone. While many of the contaminant microbes are non-pathogenic to humans and only represent a challenge to shelf-life, the fact that these products are grown in open fields presents a risk of exposure to soil- and air-borne food pathogens from *Salmonella*, *E. coli*, and *Listeria* species. Their ubiquitous distribution in nature must be addressed and eliminated. However, their elimination is further complicated by the fact that these pathogens and other non-pathogenic bacteria quickly form biofilms which provide additional protection from water-based sanitizers. The removal of these biofilms makes leaf-borne bacteria more susceptible to attack and destruction by added sanitizers.

Therefore, there is a need to develop a method of utilizing multiple sanitizers with various modes of attack that provide a multiple hurdle approach to sanitizing that provides a more effective reduction in microbial load than chlorine alone, reduces or eliminates human pathogen contamination, and increases produce shelf-life.

BRIEF SUMMARY

The methods disclosed herein address the disadvantages of the sanitizing methodologies mentioned above. Herein, methods for treating produce with a sequential combination of chlorine dioxide, chlorine, and peroxyacetic acid to reduce the microbial load of the produce are described.

The methods disclosed herein show that the use of multiple, unique sanitizers applied to the wash waters of freshly harvested produce kill and eliminate bacterial contaminants on the produce. Moreover, a particular embodiment of the present disclosure is based, at least in part, on the surprising discovery that sequential treatment with chlorine dioxide ($ClO_2$), chlorine ($Cl_2$), and peroxyacetic acid (PAA) acts synergistically to provide at least a 3.5 to 4 log unit reduction in microbial load of treated produce, as compared with a chlorine-only treatment that only provides a 2 log unit reduction. Additionally, treating produce with a mixture of $ClO_2$ and $Cl_2$, followed by treating with PAA yielded at least a 5 log unit reduction in microbial load. Moreover, sequential treatment with $ClO_2$, $Cl_2$, and PAA also resulted in the virtual elimination of pathogens, such as *Listeria*, pathogenic *E. coli*, and *Salmonella*, from produce. Advantageously, sequential treatment with $ClO_2$, $Cl_2$, and PAA provides a greater amount of sanitation in commercial produce processing than previously available in the fresh produce industry. Moreover, sequential treatment with $ClO_2$, $Cl_2$, and PAA is compatible with any commercial processing method known in the art, including without limitation, those disclosed in U.S. patent application Ser. No. 13/464,882. Additionally, sequential treatment with chlorine dioxide ($ClO_2$), chlorine ($Cl_2$), and peroxyacetic acid (PAA) can also be utilized to treat certified organic produce, as each sanitizer is approved for use with organics.

Accordingly, certain aspects of the present disclosure relate to a method for sanitizing produce, by: treating the produce with a chlorine dioxide solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid. In certain embodiments, treating with the chlorine dioxide solution occurs prior to treating with the solution containing chlorine. Preferably, treating with the solution containing chlorine occurs prior to treating with the solution containing peroxyacetic acid. In certain embodiments, treating with the chlorine dioxide solution occurs concurrently with treating with the solution containing chlorine. Preferably, the concurrent treatment with the chlorine dioxide solution and the solution containing chlorine occurs prior to treating with the solution containing peroxyacetic acid. In certain embodiments, treating with the chlorine dioxide solution occurs prior to treating with the solution containing peroxyacetic acid. Preferably, treating with the solution containing peroxyacetic acid occurs prior to treating with the solution containing chlorine. In certain embodiments, treating with the solution containing chlorine occurs prior to treating with the chlorine dioxide solution. Preferably, treating with the chlorine dioxide solution occurs prior to treating with the solution containing peroxyacetic acid. In certain embodiments, treating with the solution containing chlorine occurs prior to treating with the solution containing peroxyacetic acid. Preferably, treating with the solution containing peroxyacetic acid occurs prior to treating with the chlorine dioxide solution. In certain embodiments, treating with the solution containing peroxyacetic acid occurs prior to treating with the chlorine dioxide solution. Preferably, treating with the chlorine dioxide solution occurs prior to treating with the solution containing chlorine. In certain embodiments, treating with the solution containing peroxyacetic acid occurs prior to treating with the solution containing chlorine. Preferably, treating with the solution containing chlorine occurs prior to treating with the chlorine dioxide solution.

Other aspects of the present disclosure relate to a method for sanitizing produce, by: treating the produce with a mixture of a chlorine dioxide solution and a solution containing chlorine for a period of time sufficient to sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid. In certain embodiments, treating with the mixture occurs prior to treating with the solution containing peroxyacetic acid.

Other aspects of the present disclosure relate to a method for sanitizing produce, by: treating the produce with a chlorine dioxide solution to yield a chlorine dioxide treated produce; treating the chlorine dioxide treated produce with a solution containing chlorine to yield a chlorine treated produce; and treating the chlorine treated produce with a solution containing peroxyacetic acid to yield sanitized produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

In certain embodiments that may be combined with any of the preceding embodiments, treating with the solution containing peroxyacetic acid reduces the concentration of the chlorine dioxide solution. In certain embodiments that may be combined with any of the preceding embodiments, the concentration of the chlorine dioxide solution after treatment with the solution containing peroxyacetic acid is less than 2 ppm. In certain embodiments that may be combined with any of the preceding embodiments, treating with the chlorine dioxide solution dissolves biofilm on the surface of the produce. In certain embodiments that may be combined with any of the preceding embodiments, the chlorine dioxide solution has a concentration that ranges from 0.1 ppm to 40 ppm. In certain embodiments that may be combined with any of the preceding embodiments, treating with the chlorine dioxide solution occurs at a pH that ranges from 3 to 9. In certain embodiments that may be combined with any of the preceding embodiments, treating with the chlorine dioxide solution occurs at a temperature that ranges from 32° F. to 150° F. In certain embodiments that may be combined with any of the preceding embodiments, treating with the chlorine dioxide solution occurs for a period of time that ranges from 10 seconds to 180 seconds. In certain embodiments that may be combined with any of the preceding embodiments, treating with the chlorine dioxide solution includes immersing the produce in a wash tank containing the chlorine dioxide solution. In certain embodiments that may be combined with any of the preceding embodiments, the solution containing chlorine has a free available chlorine concentration that ranges from 30 ppm to 60 ppm. In certain embodiments that may be combined with any of the preceding embodiments, treating with the solution containing chlorine occurs at a pH that ranges from 5 to 7. In certain embodiments that may be combined with any of the preceding embodiments, treating with the solution containing chlorine occurs at a temperature that ranges from 32° F. to 150° F. In certain embodiments that may be combined with any of the preceding embodiments, treating with the solution containing chlorine occurs for a period of time that ranges from 10 seconds to 180 seconds. In certain embodiments that may be combined with any of the preceding embodiments, treating with the solution containing chlorine includes immersing the produce in a wash tank containing the chlorine dioxide solution. In certain embodiments that may be combined with any of the preceding embodiments, the solution containing peroxyacetic acid has a peroxyacetic acid concentration that ranges from 60 ppm to 80 ppm. In certain embodiments that may be combined with any of the preceding embodiments, treating with solution containing peroxyacetic acid occurs at a pH that ranges from 2.5 to 7. In certain embodiments that may be combined with any of the preceding embodiments, treating with the solution containing peroxyacetic acid occurs at a temperature that ranges from 32° F. to 150° F. In certain embodiments that may be combined with any of the preceding embodiments, treating with the solution containing peroxyacetic acid occurs for a period of time that ranges from 20 seconds to 180 seconds. In certain embodiments that may be combined with any of the preceding embodiments, treating with the solution containing peroxyacetic acid includes immersing the produce in a wash tank containing the chlorine dioxide solution. In certain embodiments that may be combined with any of the preceding embodiments, treating with the chlorine dioxide solution, the solution containing chlorine, and the solution containing peroxyacetic acid yields an additional log unit reduction in microbial load that ranges from 1.5 to 6, as compared to produce treated with a single solution selected from the chlorine dioxide solution, the solution containing chlorine, and the solution containing peroxyacetic acid. In certain embodiments that may be combined with any of the preceding embodiments, the method for sanitizing produce further includes sonicating the produce before, concurrently, or after treating with the chlorine dioxide solution, the solution containing chlorine, and/or the solution containing peroxyacetic acid. In certain embodiments that may be combined with any of the preceding embodiments, the sonicating occurs at multiple frequencies. In certain embodiments that may be combined with any of the preceding embodiments, the sonicating occurs for an amount of time that ranges from 10 seconds to 120 seconds. In certain embodiments that may be combined with any of the preceding embodiments, the method for sanitizing produce further includes treating the produce with an electrolyzed ionic solution before, concurrently, or after treating with the chlorine dioxide solution, the solution containing chlorine, and/or the solution containing peroxyacetic acid. In certain embodiments that may be combined with any of the preceding embodiments, the method for sanitizing produce further includes treating the produce with potable water after treating with the chlorine dioxide solution, the solution containing chlorine, and the solution containing peroxyacetic acid. In certain embodiments that may be combined with any of the preceding embodiments, the produce is sprayed with potable water. In certain embodiments that may be combined with any of the preceding embodiments, the method for sanitizing produce further includes drying the produce after spraying with potable water. In certain embodiments that may be combined with any of the preceding embodiments, treating with the chlorine dioxide solution, the solution containing chlorine, and the solution containing peroxyacetic acid yields an increase in shelf-life of the produce, as compared to produce treated with a single solution selected from the chlorine dioxide solution, the solution containing chlorine, and the solution containing peroxyacetic acid. In certain embodiments that may be combined with any of the preceding embodiments, the produce is selected from a vegetable, a leafy vegetable, lettuce, spinach, a ground plant, sprouts, a squash, a melon, a gourd, a fruit, a berry, a nut, and any combination thereof.

BRIEF DESCRIPTION OF THE DRAWINGS

FIG. 12 is a table depicting results of utilizing triple wash systems to reduce bacterial loads on chopped lettuce under laboratory or commercial conditions. "Treat" refers to the triple wash treatment utilized; "Initial Micro" refers to initial microbial load in log units; "Micro Red" refers to microbial log unit reduction after treatment; and "Micro Red to Control" refers microbial log unit reduction after treatment as compared to control. The condition is indicated as either "Lab," referring to laboratory conditions; or "Commercial," which refers to commercial processing plant conditions. As indicated in FIG. 12, Wash 1 is performed for 20 seconds, Wash 2 is performed for 90 seconds, and Wash 3 is performed for 30 seconds.

DETAILED DESCRIPTION

Figure 1A:
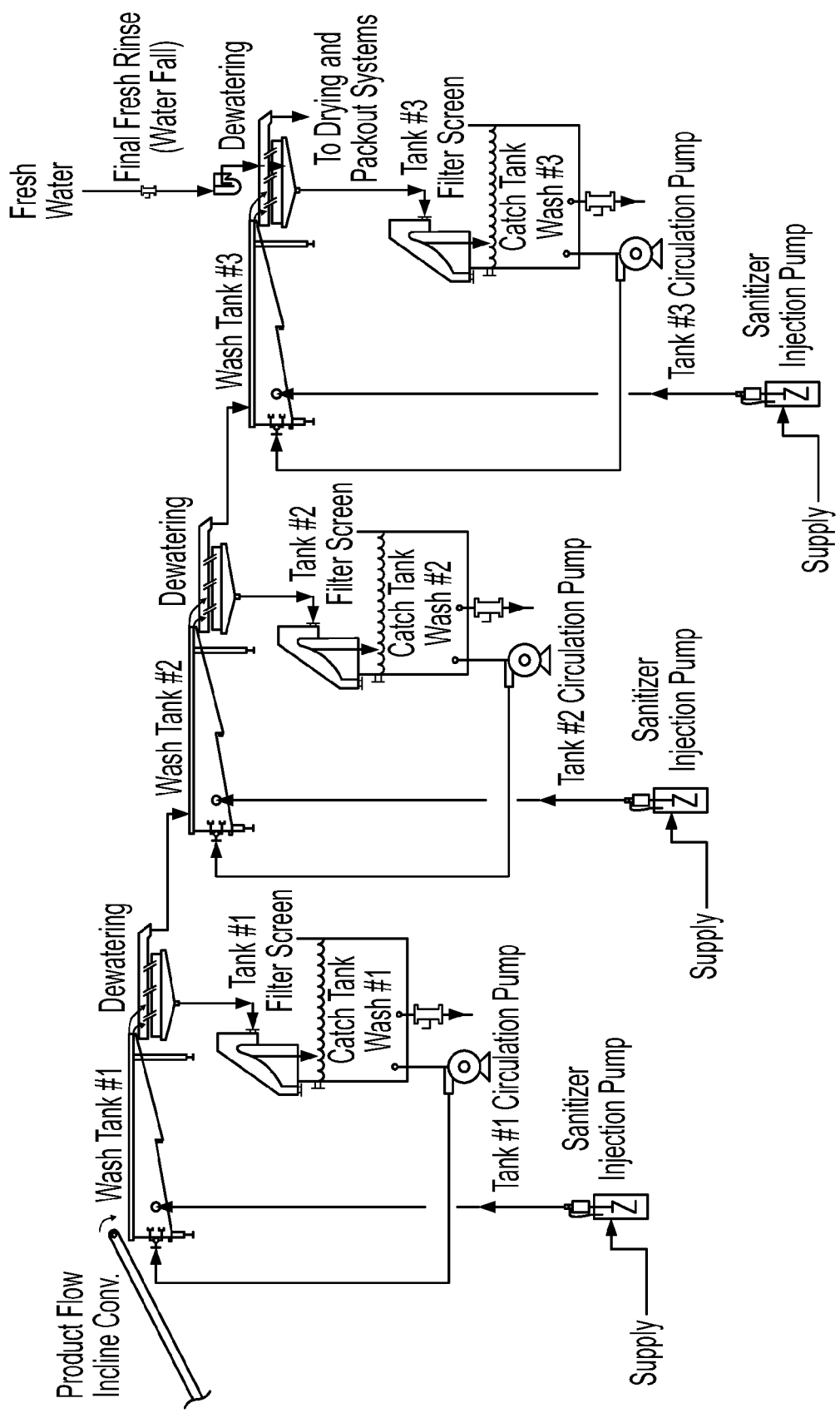
FIG. 1A is a diagram of an exemplary wash system for sanitizing produce that includes three open flumes.

The following description sets forth exemplary configurations, parameters, and the like. It should be recognized, however, that such description is not intended as a limitation on the scope of the present invention, but is instead provided as a description of exemplary embodiments.

Overview

The following embodiments describe methods for sanitizing produce by treating the produce with a chlorine dioxide ($ClO_2$) solution, treating with a solution containing chlorine ($Cl_2$), and a solution containing peroxyacetic acid (PAA). While treatment with the $ClO_2$ solution, the $Cl_2$ solution, and the PAA solution may be performed in any order, in certain preferred embodiments, the produce is first treated with the $ClO_2$ solution, then the $Cl_2$ solution, and finally with the PAA solution. Alternatively, the produce may be first treated with a mixture of the $ClO_2$ solution and the $Cl_2$ solution, and then is treated with the PAA solution.

In a certain embodiment of the present disclosure, it was surprisingly found that sequential treatment of produce with $ClO_2$, $Cl_2$, and PAA provides more effective elimination of microbial (e.g., bacterial) contamination than commercially available sanitizing methods and systems. In particular, sequential treatment of produce with $ClO_2$, $Cl_2$, and PAA results in at least an additional 1 log unit reduction in microbial load, as compared to produce treated with a single solution selected from the chlorine dioxide solution, the solution containing chlorine, and the solution containing peroxyacetic acid.

Advantageously, the methods for sanitizing produce of the present disclosure that utilize $ClO_2$, $Cl_2$, and PAA are compatible with any produce processing method known in the art. Moreover, the methods for sanitizing produce of the present disclosure are also compatible with any produce processing plant or system known in the art including, without limitation, systems that utilize open flumes (i.e., wash tanks) (e.g., FIG. 1A) and systems that utilize piping with open and closed loop flumes (e.g., FIG. 7). Accordingly, the methods for sanitizing produce of the present may be utilized with any commercial produce processing method and in any commercial produce processing plant or system.

As used herein, "sanitize" refers to reducing the microbial load on produce by treating with a sanitizer solution, such as a $ClO_2$ solution, a $Cl_2$ solution, and/or a PAA solution, as compared to produce that has not been treated with the sanitizer solution. The reduction in microbial load may be determined by any method known in the art, for example by measuring total aerobic plate counts in colony forming units per gram (CFU/g) or by measuring total log unit reduction in microbial load.

Accordingly, certain aspects of the present disclosure provide methods for sanitizing produce, by treating the produce with a chlorine dioxide solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

Other aspects of the present disclosure provide methods for sanitizing produce, by treating the produce with a mixture of a chlorine dioxide solution and a solution containing chlorine for a period of time sufficient to sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

Further aspects of the present disclosure provide a method for sanitizing produce, by treating the produce with a chlorine dioxide solution to yield a chlorine dioxide treated produce; treating the chlorine dioxide treated produce with a solution containing chlorine to yield a chlorine treated produce; and treating the chlorine treated produce with a solution containing peroxyacetic acid to yield sanitized produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

Still other aspects of the present disclosure provide a method for sanitizing produce, by treating with the chlorine dioxide solution having a concentration that ranges from 0.1 ppm to 40 ppm to yield a chlorine dioxide treated produce, where treating with chlorine dioxide solution occurs for an amount of time that ranges from 10 seconds to 180 seconds at a pH that ranges from 3 to 9 and a temperature that ranges from 32° F. to 150° F.; treating the chlorine dioxide treated produce with a solution containing chlorine having a free available chlorine concentration that ranges from 30 ppm to 60 ppm to yield a chlorine treated produce, where treating with the solution containing chlorine occurs for an amount of time that ranges from 10 seconds to 180 seconds at a pH that ranges from 5 to 7 and a temperature that ranges from 32° F. to 150° F.; and treating the chlorine treated produce with a solution containing peroxyacetic acid having a peroxyacetic acid concentration that ranges from 60 ppm to 80 ppm to yield sanitized produce, where treating with the solution containing peroxyacetic acid occurs for an amount of time that ranges from 20 seconds to 180 seconds at a pH that ranges from 2.5 to 7 and a temperature that ranges from 32° F. to 150° F., and where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

As used herein, "produce" refers to fruits, including but not limited to fresh fruit, nuts, and vegetables. Accordingly, in certain embodiments, produce that may be treated with any of the methods for sanitizing of the present disclosure include, without limitation, a vegetable, a leafy vegetable, lettuce, spinach, a ground plant, sprouts, a squash, a melon, a gourd, a fruit, a berry, a nut, and any combination thereof.

Chlorine Dioxide Solutions

Certain aspects of the present disclosure relate to treating produce with a chlorine dioxide ($ClO_2$) solution. Chlorine dioxide is a well-known sanitizer for drinking water. The properties and chemistry of chlorine dioxide are described, for example, in "The Chlorine Dioxide Handbook", D. J. Gates, American Water Works Association, Denver, 1998. Chlorine dioxide contains an odd number of electrons, making it a free radical. As such, chlorine dioxide is a highly reactive species, which is extremely unstable at temperatures above approximately −40 C.°. However, aqueous solutions of chlorine dioxide are relatively stable when diluted at about 5 g/L or less, and kept cold and away from strong light, such as direct sunlight. Moreover, chlorine dioxide reacts rapidly with any organic matter present in water.

It is well known that microbes, such as bacteria present on produce, form biofilms on the produce, which provide the microbes protection against sanitizer solutions. Removing such biofilms make the microbes more susceptible to elimination by sanitizer solutions. As disclosed herein, treating produce with chlorine dioxide breaks down the biofilm matrices or otherwise removes the microbial biofilms from the produce. Accordingly, in certain embodiments, treating produce with a chlorine dioxide solution dissolves microbial biofilms on the surface of the produce.

Chlorine dioxide may be produced by any suitable method known in the art. In one non-limiting example, chlorine dioxide may be produced by reacting a chlorite, such as sodium chlorite, with an oxidizing agent, such as chlorine or hypochlorous acid, and/or with a strong acid, such as hydrochloric acid. Chlorine dioxide can also be produced by the electrochemical reaction of sodium chlorite. Alternatively, chlorine dioxide may be produced from sodium chlorate by reducing sodium chlorate in a strong acid solution with a suitable reducing agent, such as methanol, hydrogen peroxide, or hydrochloric acid.

Moreover, chlorine dioxide may be obtained from any commercial source known in the art, including without limitation, chlorine dioxide packets, such as packets of Selectrocide™ 2L500 and Selectrocide™ A-15; chlorine dioxide tablets, such as SafeOx chlorine dioxide tablets; and chlorine dioxide generators, such as AquaPulse Systems chlorine dioxide generators and ClorTec® chlorine dioxide generators.

Chlorine dioxide solutions of the present disclosure are used at a concentration that is suitable to dissolves microbial biofilms and to sanitize produce treated with such chlorine dioxide solutions. As used herein, the concentration of chlorine dioxide solutions is given as parts-per-million (ppm). Accordingly, chlorine dioxide solutions of the present disclosure may be used at a concentration that ranges from 0.1 ppm to 40 ppm, from 0.1 ppm to 35 ppm, from 0.1 ppm to 30 ppm, from 0.1 ppm to 29 ppm, from 0.1 ppm to 28 ppm, from 0.1 ppm to 27 ppm, from 0.1 ppm to 26 ppm, from 0.1 ppm to 25 ppm, from 0.1 ppm to 24 ppm, from 0.1 ppm to 23 ppm, from 0.1 ppm to 22 ppm, from 0.1 ppm to 21 ppm, from 0.1 ppm to 20 ppm, from 0.1 ppm to 19 ppm, from 0.1 ppm to 18 ppm, from 0.1 ppm to 17 ppm, from 0.1 ppm to 16 ppm, from 0.1 ppm to 15 ppm, from 0.1 ppm to 14 ppm, from 0.1 ppm to 13 ppm, from 0.1 ppm to 12 ppm, from 0.1 ppm to 11 ppm, from 0.1 ppm to 10 ppm, from 0.1 ppm to 9 ppm, from 0.1 ppm to 8 ppm, from 0.1 ppm to 7 ppm, from 0.1 ppm to 6 ppm, from 0.1 ppm to 5 ppm, from 0.1 ppm to 4 ppm, from 0.1 ppm to 3 ppm, from 0.1 ppm to 2 ppm, from 0.1 ppm to 1 ppm, from 0.1 ppm to 0.9 ppm, from 0.1 ppm to 0.8 ppm, from 0.1 ppm to 0.7 ppm, from 0.1 ppm to 0.6 ppm, or from 0.1 ppm to 5 ppm. Alternatively, chlorine dioxide solutions of the present disclosure may be used at a concentration that ranges from 0.1 ppm to 40 ppm, 0.2 ppm to 40 ppm, 0.3 ppm to 40 ppm, 0.4 ppm to 40 ppm, 0.5 ppm to 40 ppm, 0.6 ppm to 40 ppm, 0.7 ppm to 40 ppm, 0.8 ppm to 40 ppm, 0.9 ppm to 40 ppm, 1 ppm to 40 ppm, 2 ppm to 40 ppm, from 3 ppm to 40 ppm, from 4 ppm to 40 ppm, from 5 ppm to 40 ppm, from 6 ppm to 40 ppm, from 7 ppm to 40 ppm, from 8 ppm to 40 ppm, from 9 ppm to 40 ppm, from 10 ppm to 40 ppm, from 11 ppm to 40 ppm, from 12 ppm to 40 ppm, from 13 ppm to 40 ppm, from 14 ppm to 40 ppm, from 15 ppm to 40 ppm, from 16 ppm to 40 ppm, from 17 ppm to 40 ppm, from 18 ppm to 40 ppm, from 19 ppm to 40 ppm, from 20 ppm to 40 ppm, from 21 ppm to 40 ppm, from 22 ppm to 40 ppm, from 23 ppm to 40 ppm, from 24 ppm to 40 ppm, from 25 ppm to 40 ppm, from 26 ppm to 40 ppm, from 27 ppm to 40 ppm, from 28 ppm to 40 ppm, from 29 ppm to 40 ppm, from 30 ppm to 40 ppm, from 31 ppm to 40 ppm, from 32 ppm to 40 ppm, from 33 ppm to 40 ppm, from 34 ppm to 40 ppm, or from 35 ppm to 40 ppm. In certain embodiments, chlorine dioxide solutions of the present disclosure are used at a concentration that ranges from 2 ppm to 40 ppm. Preferably, chlorine dioxide solutions of the present disclosure are used at a concentration that ranges from 15 ppm to 30 ppm.

In other embodiments, chlorine dioxide solutions of the present disclosure are used at a concentration of approximately 0.1 ppm, approximately 0.2 ppm, approximately 0.3 ppm, approximately 0.4 ppm, approximately 0.5 ppm, approximately 0.6 ppm, approximately 0.7 ppm, approximately 0.8 ppm, approximately 0.9 ppm, approximately 1 ppm, approximately 2 ppm, approximately 3 ppm, approximately 4 ppm, approximately 5 ppm, approximately 6 ppm, approximately 7 ppm, approximately 8 ppm, approximately 9 ppm, approximately 10 ppm, approximately 11 ppm, approximately 12 ppm, approximately 13 ppm, approximately 14 ppm, approximately 15 ppm, approximately 16 ppm, approximately 17 ppm, approximately 18 ppm, approximately 19 ppm, approximately 20 ppm, approximately 21 ppm, approximately 22 ppm, approximately 23 ppm, approximately 24 ppm, approximately 25 ppm, approximately 26 ppm, approximately 27 ppm, approximately 28 ppm, approximately 29 ppm, approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, or approximately 40 ppm. Preferably, chlorine dioxide solutions of the present disclosure are used at a concentration of approximately 25 ppm. As used herein an approximate concentration refers to a concentration that varies by +/−2 ppm (i.e., 24 ppm to 26 ppm).

Chlorine dioxide solutions of the present disclosure are also used at a pH that is suitable to dissolve microbial biofilms and sanitize produce treated with such chlorine dioxide solutions. For example, chlorine dioxide solutions of the present disclosure may be used at a pH that ranges from 3 to 9, from 3 to 8.5, from 3 to 8, from 3 to 7.5, from 3 to 7, from 3 to 6.5, from 3 to 6, from 3 to 5.5, from 3 to 5, from 3 to 4.5, or from 3 to 4. Alternatively, chlorine dioxide solutions of the present disclosure may be used at a pH that ranges from 3 to 9, from 3.5 to 9, from 4 to 9, from 4.5 to 9, from 5 to 9, from 5.5 to 9, from 6 to 9, from 6.5 to 9, from 7 to 9, from 7.5 to 9, or from 8 to 9.

In other embodiments, chlorine dioxide solutions of the present disclosure are used at a pH of approximately 3, approximately 3.2, approximately 3.4, approximately 3.5, approximately 3.6, approximately 3.8, approximately 4, approximately 4.2, approximately 4.4, approximately 4.5, approximately 4.6, approximately 4.8, approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, approximately 7, approximately 7.2, approximately 7.4, approximately 7.5, approximately 7.6, approximately 3.8, approximately 8, approximately 8.2, approximately 8.4, approximately 8.5, approximately 8.6, approximately 8.8, or approximately 9. As used herein an approximate pH refers to a pH that varies by +/−0.2 (i.e. pH 8.8 to 9.2).

Chlorine dioxide solutions of the present disclosure are further used at a temperature that is suitable to dissolve microbial biofilms and sanitize produce treated with such chlorine dioxide solutions. As disclosed herein, chlorine dioxide is more soluble at cold temperatures, for example temperatures under 75° F. Accordingly, chlorine dioxide solutions of the present disclosure may be used at a temperature that ranges from 25° F. to 150° F., from 25° F. to 145° F., from 25° F. to 140° F., from 25° F. to 135° F., from 25° F. to 130° F., from 25° F. to 125° F., from 25° F. to 120° F., from 25° F. to 115° F., from 25° F. to 110° F., from 25° F. to 105° F., from 25° F. to 100° F., from 25° F. to 95° F., from 25° F. to 90° F., from 25° F. to 85° F., from 25° F. to 80° F., from 25° F. to 75° F., from 25° F. to 70° F., from 25° F. to 69° F., from 25° F. to 68° F., from 25° F. to 67° F., from 25° F. to 66° F., from 25° F. to 65° F., from 25° F. to 60° F., from 25° F. to 55° F., from 25° F. to 50° F., from 25° F. to 45° F., from 25° F. to 40° F., from 25° F. to 39° F., from 25° F. to 38° F., from 25° F. to 37° F., from 25° F. to 36° F., from 25° F. to 35° F., from 25° F. to 34° F., from 25° F. to 33° F., from 25° F. to 32° F., from 25° F. to 31° F., or from 25° F. to 30° F. Alternatively, chlorine dioxide solutions of the present disclosure may be used at a temperature that ranges from 25° F. to 150° F., from 30° F. to 150° F., from 31° F. to 150° F., from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, chlorine dioxide solutions of the present disclosure are used at a temperature of approximately 25° F., approximately 26° F., approximately 27° F., approximately 28° F., approximately 29° F., approximately 30° F., approximately 31° F., approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F. As used herein an approximate temperature refers to a temperature that varies by +/−2° F. (i.e. 35° F. to 37° F.).

Moreover, produce is treated with a chlorine dioxide solution of the present disclosure for a period of time that is sufficient to dissolve microbial biofilms and sanitize the produce. For example, produce may be treated with a chlorine dioxide solution of the present disclosure for a period of time that ranges from 10 seconds to 180 seconds, from 11 seconds to 180 seconds, from 12 seconds to 180 seconds, from 13 seconds to 180 seconds, from 14 seconds to 180 seconds, from 15 seconds to 180 seconds, from 16 seconds to 180 seconds, from 17 seconds to 180 seconds, from 18 seconds to 180 seconds, from 19 seconds to 180 seconds, from 20 seconds to 180 seconds, from 21 seconds to 180 seconds, from 22 seconds to 180 seconds, from 23 seconds to 180 seconds, from 24 seconds to 180 seconds, from 25 seconds to 180 seconds, from 26 seconds to 180 seconds, from 27 seconds to 180 seconds, from 28 seconds to 180 seconds, from 29 seconds to 180 seconds, from 30 seconds to 180 seconds, from 31 seconds to 180 seconds, from 32 seconds to 180 seconds, from 33 seconds to 180 seconds, from 34 seconds to 180 seconds, from 35 seconds to 180 seconds, from 36 seconds to 180 seconds, from 37 seconds to 180 seconds, from 38 seconds to 180 seconds, from 39 seconds to 180 seconds, from 40 seconds to 180 seconds, from 41 seconds to 180 seconds, from 42 seconds to 180 seconds, from 43 seconds to 180 seconds, from 44 seconds to 180 seconds, from 45 seconds to 180 seconds, from 50 seconds to 180 seconds, from 55 seconds to 180 seconds, from 60 seconds to 180 seconds, from 70 seconds to 180 seconds, from 80 seconds to 180 seconds, from 90 seconds to 180 seconds, from 100 seconds to 180 seconds, from 110 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a chlorine dioxide solution of the present disclosure for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 110 seconds, from 10 seconds to 100 seconds, from 10 seconds to 90 seconds, from 10 seconds to 80 seconds, from 10 seconds to 70 seconds, from 10 seconds to 60 seconds, from 10 seconds to 55 seconds, from 10 seconds to 50 seconds, from 10 seconds to 45 seconds, from 10 seconds to 44 seconds, from 10 seconds to 43 seconds, from 10 seconds to 42 seconds, from 10 seconds to 41 seconds, from 10 seconds to 40 seconds, from 10 seconds to 39 seconds, from 10 seconds to 38 seconds, from 10 seconds to 37 seconds, from 10 seconds to 36 seconds, from 10 seconds to 35 seconds, from 10 seconds to 34 seconds, from 10 seconds to 33 seconds, from 10 seconds to 32 seconds, from 10 seconds to 31 seconds, from 10 seconds to 30 seconds, from 10 seconds to 29 seconds, from 10 seconds to 28 seconds, from 10 seconds to 27 seconds, from 10 seconds to 26 seconds, from 10 seconds to 25 seconds, from 10 seconds to 24 seconds, from 10 seconds to 23 seconds, from 10 seconds to 22 seconds, from 10 seconds to 21 seconds, from 10 seconds to 20 seconds, from 10 seconds to 19 seconds, from 10 seconds to 18 seconds, from 10 seconds to 17 seconds, from 10 seconds to 16 seconds, from 10 seconds to 15 seconds, from 10 seconds to 14 seconds, from 10 seconds to 13 seconds, or from 10 seconds to 12 seconds.

In other embodiments, produce may be treated with a chlorine dioxide solution of the present disclosure for approximately 10 seconds, approximately 11 seconds, approximately 12 seconds, approximately 13 seconds, approximately 14 seconds, approximately 15 seconds, approximately 16 seconds, approximately 17 seconds, approximately 18 seconds, approximately 19 seconds, approximately 20 seconds, approximately 21 seconds, approximately 22 seconds, approximately 23 seconds, approximately 24 seconds, approximately 25 seconds, approximately 26 seconds, approximately 27 seconds, approximately 28 seconds, approximately 29 seconds, approximately 30 seconds, approximately 31 seconds, approximately 32 seconds, approximately 33 seconds, approximately 34 seconds, approximately 35 seconds, approximately 36 seconds, approximately 37 seconds, approximately 38 seconds, approximately 39 seconds, approximately 40 seconds, approximately 41 seconds, approximately 42 seconds, approximately 43 seconds, approximately 44 seconds, approximately 45 seconds, approximately 50 seconds, approximately 55 seconds, approximately 60 seconds, approximately 70 seconds, approximately 80 seconds, approximately 90 seconds, approximately 100 seconds, approximately 110 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 10 seconds or 30 seconds.

Thus, in a preferred embodiment, produce is treated with a chlorine dioxide solution of the present disclosure for approximately 10 seconds. In another embodiment, produce is treated with a chlorine dioxide solution of the present disclosure for approximately 30 seconds. As used herein an approximate time of treatment refers to a period of time that varies by +/−2 seconds (i.e., 10 second to 12 seconds).

In other embodiments, chlorine dioxide solutions of the present disclosure are dosed into a wash tank, or "flume," that may be used for treating the produce. Alternatively, chlorine dioxide solution of the present disclosure may be stored in a spraying container. Thus, in certain embodiments, treating produce with a chlorine dioxide solution of the present disclosure includes immersing the produce in a wash tank containing the chlorine dioxide solution. The methods disclosed herein may further include spraying the produce with the chlorine dioxide solution.

Solutions Containing Chlorine

Other aspects of the present disclosure relate to treating produce with a solution containing chlorine ($Cl_2$). Chlorine is the most widely used sanitizer in the food industry. Chlorine is used for the treatment of, for example, produce, and drinking, processing, and wash water. The ability of chlorine to destroy microorganisms depends on the amount of free available chlorine (FAC) in the solvent, such as water. Typically, the free available chlorine is the chlorine remaining after it reacts with organic matter.

As disclosed herein, chlorine solutions generally contain molecules of hypochlorous acid (HOCl), as well as the HOCl ions $H^+$ and $^-OCl$ in equilibrium. Typically, the non-dissociated form of HOCl is the form that exerts the lethal effect on microbes. Moreover, the equilibrium of these molecules is affected by pH. Moreover, chlorine sanitizers themselves change the pH. As the pH of the solution is lowered, equilibrium favors the antimicrobial form of HOCl. As such, pH is an important factor in the sanitizing effect of chlorine solutions.

Solutions containing chlorine may be produced by any suitable method known in the art. For example, the solution may be produced from chlorine gas, hypochlorite, or from the electrolysis of an aqueous ionic solution, such as brine solutions or bicarbonate solutions. In particular, the compounds formed at the negative pole of the electrolytic cell during electrolysis (i.e., anolytes) are complex mixtures containing a high level of free chlorine, mostly existing as hypochlorous acid (e.g., U.S. Pat. No. 8,282,974). Additionally, anolytes also contain many other reactive species of oxygen in the form of free radicals, which are well known to have significant anti-microbial characteristics.

Additionally, any chlorine-containing solution known in the art may also be used as a solution of the present disclosure containing chlorine. For example, the chlorine-containing solution may be sodium hypochlorite (e.g., bleach) or calcium hypochlorite.

Solutions of the present disclosure containing chlorine are used at a free available chlorine (FAC) concentration that is suitable to sanitize produce treated with such solutions. For example, solutions of the present disclosure containing chlorine may be used at a FAC concentration that ranges from 30 ppm to 60 ppm, from 30 ppm to 55 ppm, from 30 ppm to 50 ppm, from 30 ppm to 49 ppm, from 30 ppm to 48 ppm, from 30 ppm to 47 ppm, from 30 ppm to 46 ppm, from 30 ppm to 45 ppm, from 30 ppm to 44 ppm, from 30 ppm to 43 ppm, from 10 ppm to 42 ppm, from 30 ppm to 41 ppm, from 30 ppm to 40 ppm, from 30 ppm to 39 ppm, from 30 ppm to 38 ppm, from 30 ppm to 37 ppm, from 30 ppm to 36 ppm, or from 30 ppm to 35 ppm. Alternatively, solutions of the present disclosure containing chlorine may be used at a FAC concentration that ranges from 30 ppm to 60 ppm, from 31 ppm to 60 ppm, from 32 ppm to 60 ppm, from 33 ppm to 60 ppm, from 34 ppm to 60 ppm, from 35 ppm to 60 ppm, from 36 ppm to 60 ppm, from 37 ppm to 60 ppm, from 38 ppm to 60 ppm, from 39 ppm to 60 ppm, from 40 ppm to 60 ppm, from 41 ppm to 60 ppm, from 42 ppm to 60 ppm, from 43 ppm to 60 ppm, from 44 ppm to 60 ppm, from 45 ppm to 60 ppm, from 46 ppm to 60 ppm, from 47 ppm to 60 ppm, from 48 ppm to 60 ppm, from 49 ppm to 60 ppm, from 50 ppm to 60 ppm, from 51 ppm to 60 ppm, from 52 ppm to 60 ppm, from 53 ppm to 60 ppm, from 54 ppm to 60 ppm, or from 55 ppm to 60 ppm. In certain embodiments, solutions of the present disclosure containing chlorine are used at a FAC concentration that ranges from 30 ppm to 60 ppm. Preferably, solutions of the present disclosure containing chlorine are used at a FAC concentration that ranges from 35 ppm to 50 ppm.

In other embodiments, solutions of the present disclosure containing chlorine are used at a FAC concentration of approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, approximately 40 ppm, approximately 41 ppm, approximately 42 ppm, approximately 43 ppm, approximately 44 ppm, approximately 45 ppm, approximately 46 ppm, approximately 47 ppm, approximately 48 ppm, approximately 49 ppm, approximately 50 ppm, approximately 51 ppm, approximately 52 ppm, approximately 53 ppm, approximately 54 ppm, approximately 55 ppm, approximately 56 ppm, approximately 57 ppm, approximately 58 ppm, approximately 59 ppm, or approximately 60 ppm. Preferably, solutions of the present disclosure containing chlorine are used at a FAC concentration of approximately 40 ppm.

Solutions of the present disclosure containing chlorine are also used at a pH that is suitable to sanitize produce treated with such solutions. For example, solutions of the present disclosure containing chlorine may be used at a pH that ranges from 5 to 7, from 5 to 6.8, from 5 to 6.6, from 5 to 6.5, from 5 to 6.4, from 5 to 6.2, from 5 to 6, from 5 to 5.8, from 5 to 5.6, from 5 to 5.5, or from 5 to 5.4. Alternatively, solutions of the present disclosure containing chlorine may be used at a pH that ranges from 5 to 7, from 5.2 to 7, from 5.4 to 7, from 5.5 to 7, from 5.6 to 7, from 5.8 to 7, from 6 to 7, from 6.2 to 7, from 6.4 to 7, from 6.5 to 7, or from 6.6 to 7.

In other embodiments, solutions of the present disclosure containing chlorine are used at a pH of approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, or approximately 7. Preferably, solutions of the present disclosure containing chlorine are used at a pH of approximately 6.5.

Solutions of the present disclosure containing chlorine are further used at a temperature that is suitable to sanitize produce treated with such solutions. For example, solutions of the present disclosure containing chlorine may be used at a temperature that ranges from 25° F. to 150° F., from 25° F. to 145° F., from 25° F. to 140° F., from 25° F. to 135° F., from 25° F. to 130° F., from 25° F. to 125° F., from 25° F. to 120° F., from 25° F. to 115° F., from 25° F. to 110° F., from 25° F. to 105° F., from 25° F. to 100° F., from 25° F. to 95° F., from 25° F. to 90° F., from 25° F. to 85° F., from 25° F. to 80° F., from 25° F. to 75° F., from 25° F. to 70° F., from 25° F. to 69° F., from 25° F. to 68° F., from 25° F. to 67° F., from 25° F. to 66° F., from 25° F. to 65° F., from 25° F. to 60° F., from 25° F. to 55° F., from 25° F. to 50° F., from 25° F. to 45° F., from 25° F.

to 40° F., from 25° F. to 39° F., from 25° F. to 38° F., from 25° F. to 37° F., from 25° F. to 36° F., from 25° F. to 35° F., from 25° F. to 34° F., from 25° F. to 33° F., from 25° F. to 32° F., from 25° F. to 31° F., or from 25° F. to 30° F. Alternatively, solutions of the present disclosure containing chlorine may be used at a temperature that ranges from 25° F. to 150° F., from 30° F. to 150° F., from 31° F. to 150° F., from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, solutions of the present disclosure containing chlorine are used at a temperature of approximately 25° F., approximately 26° F., approximately 27° F., approximately 28° F., approximately 29° F., approximately 30° F., approximately 31° F., approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F.

Moreover, produce is treated with a solution of the present disclosure containing chlorine for a period of time that is sufficient to sanitize the produce. For example, produce may be treated with a solution of the present disclosure containing chlorine for a period of time that ranges from 10 seconds to 180 seconds, from 15 seconds to 180 seconds, from 20 seconds to 180 seconds, from 25 seconds to 180 seconds, from 30 seconds to 180 seconds, from 35 seconds to 180 seconds, from 40 seconds to 180 seconds, from 45 seconds to 180 seconds, from 50 seconds to 180 seconds, from 55 seconds to 180 seconds, from 60 seconds to 180 seconds, from 65 seconds to 180 seconds, from 70 seconds to 180 seconds, from 75 seconds to 180 seconds, from 80 seconds to 180 seconds, from 81 seconds to 180 seconds, from 82 seconds to 180 seconds, from 83 seconds to 180 seconds, from 84 seconds to 180 seconds, from 85 seconds to 180 seconds, from 86 seconds to 180 seconds, from 87 seconds to 180 seconds, from 88 seconds to 180 seconds, from 89 seconds to 180 seconds, from 90 seconds to 180 seconds, from 91 seconds to 180 seconds, from 92 seconds to 180 seconds, from 93 seconds to 180 seconds, from 94 seconds to 180 seconds, from 95 seconds to 180 seconds, from 96 seconds to 180 seconds, from 97 seconds to 180 seconds, from 98 seconds to 180 seconds, from 99 seconds to 180 seconds, from 100 seconds to 180 seconds, from 105 seconds to 180 seconds, from 110 seconds to 180 seconds, from 115 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a solution of the present disclosure containing chlorine for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 115 seconds, from 10 seconds to 110 seconds, from 10 seconds to 105 seconds, from 10 seconds to 100 seconds, from 10 seconds to 99 seconds, from 10 seconds to 98 seconds, from 10 seconds to 97 seconds, from 10 seconds to 96 seconds, from 10 seconds to 95 seconds, from 10 seconds to 94 seconds, from 10 seconds to 93 seconds, from 10 seconds to 92 seconds, from 10 seconds to 91 seconds, from 10 seconds to 90 seconds, from 10 seconds to 89 seconds, from 10 seconds to 88 seconds, from 10 seconds to 87 seconds, from 10 seconds to 86 seconds, from 10 seconds to 85 seconds, from 10 seconds to 84 seconds, from 10 seconds to 83 seconds, from 10 seconds to 82 seconds, from 10 seconds to 81 seconds, from 10 seconds to 80 seconds, from 10 seconds to 75 seconds, from 10 seconds to 70 seconds, from 10 seconds to 65 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds from 10 seconds to 20 seconds, or from 10 seconds to 15 seconds.

In other embodiments, produce may be treated with a solution of the present disclosure containing chlorine for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 62 seconds, approximately 64 seconds, approximately 65 seconds, approximately 66 seconds, approximately 68 seconds, approximately 70 seconds, approximately 72 seconds, approximately 74 seconds, approximately 75 seconds, approximately 76 seconds, approximately 78 seconds, approximately 80 seconds, approximately 81 seconds, approximately 82 seconds, approximately 83 seconds, approximately 84 seconds, approximately 85 seconds, approximately 86 seconds, approximately 87 seconds, approximately 88 seconds, approximately 89 seconds, approximately 90 seconds, approximately 91 seconds, approximately 92 seconds, approximately 93 seconds, approximately 94 seconds, approximately 95 seconds, approximately 96 seconds, approximately 97 seconds, approximately 98 seconds, approximately 99 seconds, approximately 100 seconds, approximately 112 seconds, approximately 114 seconds, approximately 115 seconds, approximately 116 seconds, approximately 118 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 90 seconds. Thus, in a preferred embodiment, produce is treated with a solution of the present disclosure containing chlorine for approximately 90 seconds.

In other embodiments, solutions of the present disclosure containing chlorine are dosed into a wash tank, or "flume," that may be used for treating the produce. Alternatively, solutions of the present disclosure containing chlorine may be stored in a spraying container. Thus, in certain embodiments, treating produce with a solution of the present disclosure containing chlorine includes immersing the produce in a wash tank containing the solution containing chlorine. The methods disclosed herein may further include spraying the produce with the solution containing chlorine.

Solutions Containing Peroxyacetic Acid

Other aspects of the present disclosure relate to treating produce with a solution containing peroxyacetic acid (PAA). As used herein, "peroxyacetic acid," "PAA," and "peracetic acid" are used interchangeably and refer to an organic peroxide having the formula: $CH_3CO_3H$. Peroxyacetic acid is generally formed by reacting acetic acid with hydrogen peroxide.

Peroxyacetic acid is a sanitizer that is known to be effective in reducing microbial counts in produce wash water and on fruit surfaces. Moreover, peroxyacetic acid can significantly reduce *Salmonella* and *E. coli* 0157:H7 populations on fresh fruit (e.g., Park and Beuchat, 1999. *Dairy Food Environ sanit* 19:842). Advantageously, is a safe and non-toxic sanitizer that breaks-down to oxygen and acetic acid after use. Accordingly, peroxyacetic acid is approved in the U.S. for use either in wash water or for direct application to whole or cut fruits and vegetables.

Solutions containing peroxyacetic may be produced by any suitable method known in the art. For example, peroxyacetic acid may be produce by autoxidizing acetaldehyde, by reacting acetic acid with hydrogen peroxide, or by reacting acetyl chloride and acetic anhydride.

Moreover, peroxyacetic acid may be obtained from any commercial source known in the art, including without limitation, packets of SaniDate® 5.0, SaniDate® 5.0 liquid concentrate, Tsunami® 100, and PERACLEAN® formulations. It will be understood that solutions containing peroxyacetic acid may include additional compounds. For example, commercial solutions containing peroxyacetic acid may contain approximately 5.25% of peroxyacetic acid by volume, 14% of acetic acid by volume, and 23% of hydrogen peroxide by volume. Moreover, it will be understood that commercial solutions containing peroxyacetic acid typically contain approximately 5% to 15% of peroxyacetic acid with varying amounts of hydrogen peroxide.

Solutions of the present disclosure containing peroxyacetic acid are used at a peroxyacetic acid concentration that is suitable to sanitize produce treated with such solutions. For example, solutions of the present disclosure containing peroxyacetic acid may be used at a peroxyacetic acid concentration that ranges from 60 ppm to 100 ppm, from 60 ppm to 95 ppm, from 60 ppm to 90 ppm, from 60 ppm to 89 ppm, from 60 ppm to 88 ppm, from 60 ppm to 87 ppm, from 60 ppm to 86 ppm, from 60 ppm to 85 ppm, from 60 ppm to 84 ppm, from 60 ppm to 83 ppm, from 10 ppm to 82 ppm, from 60 ppm to 81 ppm, from 60 ppm to 80 ppm, from 60 ppm to 79 ppm, from 60 ppm to 78 ppm, from 60 ppm to 77 ppm, from 60 ppm to 76 ppm, from 60 ppm to 75 ppm, from 60 ppm to 74 ppm, from 60 ppm to 73 ppm, from 60 ppm to 72 ppm, from 60 ppm to 71 ppm, from 60 ppm to 70 ppm, from 60 ppm to 65 ppm. Alternatively, solutions of the present disclosure containing peroxyacetic acid may be used at a peroxyacetic acid concentration that ranges from 60 ppm to 100 ppm, from 65 ppm to 100 ppm, from 70 ppm to 100 ppm, from 71 ppm to 60 ppm, from 72 ppm to 100 ppm, from 73 ppm to 100 ppm, from 74 ppm to 100 ppm, from 75 ppm to 100 ppm, from 76 ppm to 100 ppm, from 77 ppm to 100 ppm, from 78 ppm to 100 ppm, from 79 ppm to 100 ppm, from 80 ppm to 100 ppm, from 81 ppm to 100 ppm, from 82 ppm to 100 ppm, from 83 ppm to 100 ppm, from 84 ppm to 100 ppm, from 85 ppm to 100 ppm, from 86 ppm to 100 ppm, from 87 ppm to 100 ppm, from 88 ppm to 100 ppm, from 89 ppm to 100 ppm, from 90 ppm to 100 ppm, or from 95 ppm to 100 ppm. In certain embodiments, solutions of the present disclosure containing peroxyacetic acid are used at a peroxyacetic acid concentration that ranges from 60 ppm to 100 ppm. Preferably, solutions of the present disclosure containing peroxyacetic acid are used at a peroxyacetic acid concentration that ranges from 75 ppm to 90 ppm.

In other embodiments, solutions of the present disclosure containing peroxyacetic acid are used at a peroxyacetic acid concentration of approximately 60 ppm, approximately 61 ppm, approximately 62 ppm, approximately 63 ppm, approximately 64 ppm, approximately 65 ppm, approximately 66 ppm, approximately 67 ppm, approximately 68 ppm, approximately 69 ppm, approximately 70 ppm, approximately 71 ppm, approximately 72 ppm, approximately 73 ppm, approximately 74 ppm, approximately 75 ppm, approximately 76 ppm, approximately 77 ppm, approximately 78 ppm, approximately 79 ppm, approximately 80 ppm, approximately 81 ppm, approximately 82 ppm, approximately 83 ppm, approximately 84 ppm, approximately 85 ppm, approximately 86 ppm, approximately 87 ppm, approximately 88 ppm, approximately 89 ppm, approximately 90 ppm, approximately 91 ppm, approximately 92 ppm, approximately 93 ppm, approximately 94 ppm, approximately 95 ppm, approximately 96 ppm, approximately 97 ppm, approximately 98 ppm, approximately 99 ppm, or approximately 100 ppm. Preferably, solutions of the present disclosure containing peroxyacetic acid are used at a peroxyacetic acid concentration of approximately 80 ppm.

Solutions of the present disclosure containing peroxyacetic acid are also used at a pH that is suitable to sanitize produce treated with such solutions. For example, solutions of the present disclosure containing peroxyacetic acid may be used at a pH that ranges from 2.5 to 7, from 2.5 to 6.5, from 2.5 to 6, from 2.5 to 5.5, from 2.5 to 5.5, from 2.5 to 5, from 2.5 to 4.5, from 2.5 to 4, from 2.5 to 3.5, and from 2.5 to 3. Alternatively, solutions of the present disclosure containing peroxyacetic acid may be used at a pH that ranges from 2.5 to 7, from 3 to 7, from 3.5 to 7, from 4 to 7, from 4.5 to 7, from 5 to 7, from 5.5 to 7, from 6 to 7, and from 6.5 to 7. In some embodiments, solutions of the present disclosure containing peroxyacetic acid may be used at a pH that ranges from 2.5 to 4.5, from 2.5 to 4.3, from 2.5 to 4.3, from 2.5 to 4.1, from 2.5 to 3, from 2.5 to 2.9, or from 2.5 to 2.7. In other embodiments, solutions of the present disclosure containing peroxyacetic acid may be used at a pH that ranges from 2.5 to 4.5, from 2.7 to 4.5, from 2.9 to 4.5, from 3 to 4.5, from 3.3 to 4.5, from 3.5 to 4.5, from 3.7 to 4.5, from 3.9 to 4.5, from 4 to 4.5, from 4.1 to 4.5, or from 4.3 to 4.5. In further embodiments, solutions of the present disclosure containing peroxyacetic acid may be used at a pH that ranges from 5 to 7, from 5 to 6.8, from 5 to 6.6, from 5 to 6.5, from 5 to 6.4, from 5 to 6.2, from 5 to 6, from 5 to 5.8, from 5 to 5.6, from 5 to 5.5, or from 5 to 5.4. In other embodiments, solutions of the present disclosure containing chlorine may be used at a pH that ranges from 5 to 7, from 5.2 to 7, from 5.4 to 7, from 5.5 to 7, from 5.6 to 7, from 5.8 to 7, from 6 to 7, from 6.2 to 7, from 6.4 to 7, from 6.5 to 7, or from 6.6 to 7.

In other embodiments, solutions of the present disclosure containing peroxyacetic acid are used at a pH of approximately 2.5, approximately 2.6, approximately 2.7, approximately 2.8, approximately 2.9, approximately 3, approximately 3.1, approximately 3.2, approximately 3.3, approximately 3.4, approximately 3.5, approximately 3.6, approximately 3.7, approximately 3.8, approximately 3.9, approximately 4, approximately 4.1, approximately 4.2, approximately 4.3, approximately 4.4, approximately 4.5, approximately 4.6, approximately 4.7, approximately 4.8, approximately 4.9, approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, or approximately 7.

As disclosed herein, solutions of the present disclosure containing peroxyacetic acid are also useful for inactivating the chlorine dioxide used in chlorine dioxide solutions of the present disclosure. Without wishing to be bound by theory, it is believed that solutions of the present disclosure containing peroxyacetic acid and used at a pH that ranges from 2.5 to 7 are able to inactivate the chlorine dioxide solution by decreasing the concentration of the chlorine dioxide to below 3 ppm. Accordingly, in certain embodiments, treating produce with a solution of the present disclosure containing peroxyacetic acid reduces the concentration of a chlorine dioxide solution of the present disclosure. Preferably, the concentration of the chlorine dioxide solution after treatment with the solution containing peroxyacetic acid is less than 10 ppm, less than 9 ppm, less than 8 ppm, less than 7 ppm, less than 6 ppm, less than 5 ppm, less than 4 ppm, less than 3 ppm, less than 2 ppm, less than 1 ppm, less than 0.9 ppm, less than 0.8 ppm less than 0.7 ppm less than 0.6 ppm less than 0.5 ppm less than 0.4 ppm less than 0.3 ppm less than 0.2 ppm less than 0.1 ppm, less than 0.09 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, less than 0.001 ppm, less than 0.0001 ppm, or less. More preferably, the concentration of the chlorine dioxide solution after treatment with the solution containing peroxyacetic acid is less than 2 ppm.

Solutions of the present disclosure containing peroxyacetic acid are further used at a temperature that is suitable to sanitize produce treated with such solutions. For example, solutions of the present disclosure containing peroxyacetic acid may be used at a temperature that ranges from 25° F. to 150° F., from 25° F. to 145° F., from 25° F. to 140° F., from 25° F. to 135° F., from 25° F. to 130° F., from 25° F. to 125° F., from 25° F. to 120° F., from 25° F. to 115° F., from 25° F. to 110° F., from 25° F. to 105° F., from 25° F. to 100° F., from 25° F. to 95° F., from 25° F. to 90° F., from 25° F. to 85° F., from 25° F. to 80° F., from 25° F. to 75° F., from 25° F. to 70° F., from 25° F. to 69° F., from 25° F. to 68° F., from 25° F. to 67° F., from 25° F. to 66° F., from 25° F. to 65° F., from 25° F. to 60° F., from 25° F. to 55° F., from 25° F. to 50° F., from 25° F. to 45° F., from 25° F. to 40° F., from 25° F. to 39° F., from 25° F. to 38° F., from 25° F. to 37° F., from 25° F. to 36° F., from 25° F. to 35° F., from 25° F. to 34° F., from 25° F. to 33° F., from 25° F. to 32° F., from 25° F. to 31° F., or from 25° F. to 30° F. Alternatively, solutions of the present disclosure containing peroxyacetic acid may be used at a temperature that ranges from 25° F. to 150° F., from 30° F. to 150° F., from 31° F. to 150° F., from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, solutions of the present disclosure containing peroxyacetic acid are used at a temperature of approximately 25° F., approximately 26° F., approximately 27° F., approximately 28° F., approximately 29° F., approximately 30° F., approximately 31° F., approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F.

Moreover, produce is treated with a solution of the present disclosure containing peroxyacetic acid for a period of time that is sufficient to sanitize the produce. For example, produce may be treated with a solution of the present disclosure containing peroxyacetic acid for a period of time that ranges from 20 seconds to 180 seconds, from 21 seconds to 180 seconds, from 22 seconds to 180 seconds, from 23 seconds to 180 seconds, from 24 seconds to 180 seconds, from 25 seconds to 180 seconds, from 26 seconds to 180 seconds, from 27 seconds to 180 seconds, from 28 seconds to 180 seconds, from 29 seconds to 180 seconds, from 30 seconds to 180 seconds, from 31 seconds to 180 seconds, from 32 seconds to 180 seconds, from 33 seconds to 180 seconds, from 34 seconds to 180 seconds, from 35 seconds to 180 seconds, from 36 seconds to 180 seconds, from 37 seconds to 180 seconds, from 38 seconds to 180 seconds, from 39 seconds to 180 seconds, from 40 seconds to 180 seconds, from 41 seconds to 180 seconds, from 42 seconds to 180 seconds, from 43 seconds to 180 seconds, from 44 seconds to 180 seconds, from 45 seconds to 180 seconds, from 46 seconds to 180 seconds, from 47 seconds to 180 seconds, from 48 seconds to 180 seconds, from 49 seconds to 180 seconds, from 50 seconds to 180 seconds, from 55 seconds to 180 seconds, from 60 seconds to 180 seconds, from 70 seconds to 180 seconds, from 80 seconds to 180 seconds, from 90 seconds to 180 seconds, from 100 seconds to 180 seconds, from 110 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a solution of the present disclosure containing peroxyacetic acid for a period of time that ranges from 20 seconds to 180 seconds, from 20 seconds to 170 seconds, from 20 seconds to 160 seconds, from 20 seconds to 150 seconds, from 20 seconds to 140 seconds, from 20 seconds to 130 seconds, from 20 seconds to 120 seconds, from 20 seconds to 110 seconds, from 20 seconds to 100 seconds, from 20 seconds to 90 seconds, from 20 seconds to 80 seconds, from 20 seconds to 70 seconds, from 20 seconds to 60 seconds, from 20 seconds to 55 seconds, from 20 seconds to 50 seconds, from 20 seconds to 45 seconds, from 20 seconds to 44 seconds, from 20 seconds to 43 seconds, from 20 seconds to 42 seconds, from 20 seconds to 41 seconds, from 20 seconds to 40 seconds, from 20 seconds to 39 seconds, from 20 seconds to 38 seconds, from 20 seconds to 37 seconds, from 20 seconds to 36 seconds, from 20 seconds to 35 seconds, from 20 seconds to 34 seconds, from 20 seconds to 33 seconds, from 20 seconds to 32 seconds, from 20 seconds to 31 seconds, from 20 seconds to 30 seconds, from 20 seconds to 29 seconds, from 20 seconds to 28 seconds, from 20 seconds to 27 seconds, from 20 seconds to 26 seconds, or from 20 seconds to 25 seconds.

In other embodiments, produce may be treated with a solution of the present disclosure containing peroxyacetic acid for approximately 20 seconds, approximately 21 seconds, approximately 22 seconds, approximately 23 seconds, approximately 24 seconds, approximately 25 seconds, approximately 26 seconds, approximately 27 seconds, approximately 28 seconds, approximately 29 seconds, approximately 30 seconds, approximately 31 seconds, approximately 32 seconds, approximately 33 seconds, approximately 34 seconds, approximately 35 seconds, approximately 36 seconds, approximately 37 seconds, approximately 38 seconds, approximately 39 seconds, approximately 40 seconds, approximately 41 seconds, approximately 42 seconds, approximately 43 seconds, approximately 44 seconds, approximately 45 seconds, approximately 50 seconds, approximately 55 seconds, approximately 60 seconds, approximately 70 seconds, approximately 80 seconds, approximately 90 seconds, approximately 100 seconds, approximately 110 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for 30 seconds. Thus, in a preferred embodiment, produce is treated with a solution of the present disclosure containing peroxyacetic acid for approximately 30 seconds.

In other embodiments, solutions of the present disclosure containing peroxyacetic acid are dosed into a wash tank, or "flume," that may be used for treating the produce. Alternatively, solutions of the present disclosure containing peroxyacetic acid may be stored in a spraying container. Thus, in certain embodiments, treating produce with a solution of the present disclosure containing peroxyacetic acid includes immersing the produce in a wash tank containing the solution containing peroxyacetic acid. The methods disclosed herein may further include spraying the produce with the solution containing peroxyacetic acid.

Sonication

A further aspect of the present disclosure relates to sonicating produce before, concurrently, or after treating with a chlorine dioxide solution of the present disclosure, a solution of the present disclosure containing chlorine, and/or a solution of the present disclosure containing peroxyacetic acid.

The kinetics of sonication, which are attributable to adiabatic affects, may further sanitize the produce. By selecting a specific sonication frequency at a given intensity within the "ultra" range and time, an additional, incremental sanitizing affect may be obtained. In a preferred embodiment, the sonication is ultrasonication, and is performed using a Crest Instruments Ceramic Ultrasonic Generator, from Crest Instruments, rated at 500 watts and operating at a frequency of 58 kHz. While ultrasonication is preferred, it is envisioned that other forms of kinetic energy may also enhance the de-soiling and disinfecting effects of the catholyte and anolyte solutions.

The ultrasonication may occur at a frequency of approximately 15 kHz, 16 kHz, 17 kHz, 18 kHz, 19 kHz, 20 kHz, 20.3 kHz, 20.5 kHz, 20.7 kHz, 20.9 kHz, 21 kHz, 21.3 kHz, 21.5 kHz, 21.7 kHz, 21.9 kHz, 22 kHz, 22.1 kHz, 22.2 kHz, 22.3 kHz, 22.4 kHz, 22.5 kHz, 22.6 kHz, 22.7 kHz, 22.8 kHz, 22.9 kHz, 23 kHz, 23.3 kHz, 23.5 kHz, 23.7 kHz, 23.9 kHz, 24 kHz, 24.5 kHz, 25 kHz, 26 kHz, 27 kHz, 28 kHz, 29 kHz, 30 kHz, 31 kHz, 32 kHz, 33 kHz, 34 kHz, 35 kHz, 36 kHz, 37 kHz, 38 kHz, 39 kHz, 40 kHz, 41 kHz, 42 kHz, 43 kHz, 44 kHz, 45 kHz, 46 kHz, 47 kHz, 48 kHz, 49 kHz, 50 kHz, 51 kHz, 52 kHz, 53 kHz, 54 kHz, 55 kHz, 55.3 kHz, 55.7 kHz, 55.9 kHz, 56 kHz, 56.3 kHz, 56.5 kHz, 56.7 kHz, 56.9 kHz, 57 kHz, 57.1 kHz, 57.2 kHz, 57.3 kHz, 57.4 kHz, 57.5 kHz, 57.6 kHz, 57.7 kHz, 57.8 kHz, 57.9 kHz, 58 kHz, 58.1 kHz, 58.2 kHz, 58.3 kHz, 58.4 kHz, 58.5 kHz, 58.6 kHz, 58.7 kHz, 58.8 kHz, 58.9 kHz, 59 kHz, 59.3 kHz, 59.5 kHz, 59.7 kHz, 59.9 kHz, 60 kHz, 61 kHz, 62 kHz, 63 kHz, 64 kHz, 65 kHz, 66 kHz, 67 kHz, 68 kHz, 69 kHz, or 70 kHz. In certain embodiments, the ultrasonication occurs at a frequency that ranges from approximately 20 kHz to approximately 60 kHz. Preferably the ultrasonication occurs at a frequency of approximately 58 kHz, or approximately 22.3 kHz. Alternatively multiple ultrasonication frequencies may be used instead of a single ultrasonication frequency. As used herein "a frequency of approximately" refers to a frequency that varies by +/−0.2 kHz (i.e., 22.1 kHz to 22.5 kHz).

In preferred embodiments, the ultrasonication occurs for a period of time that ranges from 10 seconds to 120 seconds, from 15 seconds to 120 seconds, from 20 seconds to 120 seconds, from 25 seconds to 120 seconds, from 30 seconds to 120 seconds, from 35 seconds to 120 seconds, from 40 seconds to 120 seconds, from 45 seconds to 120 seconds, from 50 seconds to 120 seconds, from 55 seconds to 120 seconds, from 60 seconds to 120 seconds, from 65 seconds to 120 seconds, from 70 seconds to 120 seconds, from 75 seconds to 120 seconds, from 80 seconds to 120 seconds, from 85 seconds to 120 seconds, from 90 seconds to 120 seconds, from 95 seconds to 120 seconds, from 100 seconds to 120 seconds, from 105 seconds to 120 seconds, from 110 seconds to 120 seconds, or from 115 seconds to 120 seconds. Alternatively, the ultrasonication occurs for a period of time that ranges from 10 seconds to 120 seconds, from 10 seconds to 115 seconds, from 10 seconds to 110 seconds, from 10 seconds to 105 seconds, from 10 seconds to 100 seconds, from 10 seconds to 95 seconds, from 10 seconds to 90 seconds, from 10 seconds to 85 seconds, from 10 seconds to 80 seconds, from 10 seconds to 75 seconds, from 10 seconds to 70 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds, from 10 seconds to 20 seconds, or from 10 seconds to 15 seconds.

In other embodiments, the ultrasonication occurs for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 65 seconds, approximately 70 seconds, approximately 75 seconds, approximately 80 seconds, approximately 85 seconds, approximately 90 seconds, approximately 95 seconds, approximately 100 seconds, approximately 115 seconds, or approximately 120 seconds. Preferably the methods disclosed herein are adapted to current processing plants that use piping with open and closed loop flumes. In current processing plants, the lag time between inlet and discharge in a flume wash section is typically 20 seconds. Thus, in a preferred embodiment, the ultrasonication occurs for approximately 20 seconds.

Sanitizing Produce

Further aspects of the present disclosure relate to methods for sanitizing produce by treating the produce with a chlorine dioxide solution of the present disclosure, a solution of the present disclosure containing chlorine, and a solution of the present disclosure containing peroxyacetic acid.

In particular, the present disclosure relates to sanitizing produce by treating the produce with a chlorine dioxide solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid.

The produce may be treated with each of the three solutions in any order. For example, in certain embodiments, treating with the chlorine dioxide solution occurs prior to treating with the solution containing chlorine and treating with the solution containing chlorine occurs prior to treating with the solution containing peroxyacetic acid. Alternatively, the produce may be treated concurrently with the chlorine dioxide solution and the solution containing chlorine. Preferably, this occurs prior to treating with the solution containing peroxyacetic acid. In other embodiments, treating with the chlorine dioxide solution occurs prior to treating with the solution containing peroxyacetic acid and treating with the solution containing peroxyacetic acid occurs prior to treating with the solution containing chlorine.

In other embodiments, treating with the solution containing chlorine occurs prior to treating with the chlorine dioxide solution and treating with the chlorine dioxide solution occurs prior to treating with the solution containing peroxyacetic acid. Alternatively, treating with the solution containing chlorine occurs prior to treating with the solution containing peroxyacetic acid and treating with the solution containing peroxyacetic acid occurs prior to treating with the chlorine dioxide solution.

In still other embodiments, treating with the solution containing peroxyacetic acid occurs prior to treating with the chlorine dioxide solution and treating with the chlorine dioxide solution occurs prior to treating with the solution containing chlorine. Alternatively, treating with the solution containing peroxyacetic acid occurs prior to treating with the solution containing chlorine and treating with the solution containing chlorine occurs prior to treating with the chlorine dioxide solution.

Moreover, as disclosed herein, treating produce with a mixture of a chlorine dioxide solution and a solution containing chlorine, followed by a solution containing peroxyacetic acid results in at least a 5 log unit reduction in microbial load. Accordingly, other aspects of the present disclosure relate to sanitizing produce, by treating the produce with a mixture of a chlorine dioxide solution and a solution containing chlorine for a period of time sufficient to sanitize the produce; and treating the produce with a solution containing peroxyacetic acid for a period of time sufficient to further sanitize the produce, where treating with the chlorine dioxide solution, the solution containing chlorine, and the solution containing peroxyacetic acid yields at least an additional 1 log unit reduction in microbial load, as compared to produce treated with a single solution selected from the chlorine dioxide solution, the solution containing chlorine, and the solution containing peroxyacetic acid. In certain embodiments, treating with the mixture occurs prior to treating with the solution containing peroxyacetic acid.

Any suitable method known in the art may be used to determine log unit reduction in microbial load. For example, microbial load may be determined by calculating the total Aerobic Plate Counts (APC) in colony forming units per gram (CFU/g). Microbial APC counts may be on the order of, for example, $10^6$, and so preferably log units are used to compare APC counts.

Accordingly, in certain embodiments, treating produce with a chlorine dioxide solution of the present disclosure, a solution of the present disclosure containing chlorine, and a solution of the present disclosure containing peroxyacetic acid yields an additional log unit reduction in microbial load that ranges from 1.5 to 6, from 2 to 6, from 2.5 to 6, from 2.6 to 6, from 2.8 to 6, from 3 to 6, from 3.2 to 6, from 3.4 to 6, from 3.6 to 6, from 3.8 to 6, from 4 to 6, from 4.2 to 6, from 4.4 to 6, from 4.6 to 6, from 4.8 to 6, from 5 to 6, from 5.2 to 6, from 5.4 to 6, or 5.6 to 6, as compared to produce treated with a single solution selected from a chlorine dioxide solution, a solution containing chlorine, and a solution containing peroxyacetic acid. Alternatively, treating produce with a chlorine dioxide solution of the present disclosure, a solution of the present disclosure containing chlorine, and a solution of the present disclosure containing peroxyacetic acid yields an additional log unit reduction in microbial load that ranges from 1.5 to 6, from 1.5 to 5.8, from 1.5 to 5.6, from 1.5 to 5.4, from 1.5 to 5.2, from 1.5 to 5, from 1.5 to 4.8, from 1.5 to 4.6, from 1.5 to 4.4, from 1.5 to 4.2, from 1.5 to 4, from 1.5 to 3.8, from 1.5 to 3.6, from 1.5 to 3.4, from 1.5 to 3.2, from 1.5 to 3, from 1.5 to 2.8, from 1.5 to 2.6, from 1.5 to 2.4, from 1.5 to 2.2, from 1.5 to 2, or from 1.5 to 1.8, as compared to produce treated with a single solution selected from a chlorine dioxide solution, a solution containing chlorine, and a solution containing peroxyacetic acid.

In other embodiments, treating produce with a chlorine dioxide solution of the present disclosure, a solution of the present disclosure containing chlorine, and a solution of the present disclosure containing peroxyacetic acid yields approximately an additional 1.5 log unit reduction, approximately an additional 2 log unit reduction, approximately an additional 2.5 log unit reduction, approximately an additional 2.6 log unit reduction, approximately an additional 2.8 log unit reduction, approximately an additional 3 log unit reduction, approximately an additional 3.2 log unit reduction, approximately an additional 3.4 log unit reduction, approximately an additional 3.6 log unit reduction, approximately an additional 3.8 log unit reduction, approximately an additional 4 log unit reduction, approximately an additional 4.2 log unit reduction, approximately an additional 4.4 log unit reduction, approximately an additional 4.6 log unit reduction, approximately an additional 4.8 log unit reduction, approximately an additional 5 log unit reduction, approximately an additional 5.2 log unit reduction, approximately an additional 5.4 log unit reduction, approximately an additional 5.6 log unit reduction, approximately an additional 5.8 log unit reduction, or approximately an additional 6 log unit reduction, as compared to produce treated with a single solution selected from a chlorine dioxide solution, a solution containing chlorine, and a solution containing peroxyacetic acid.

Advantageously, the at least an additional 1 log unit reduction in microbial load not only sanitizes the produce, but also increases the shelf-life of the treated produce. Accordingly, in certain embodiments, treating with a chlorine dioxide solution of the present disclosure, a solution of the present disclosure containing chlorine, and a solution of the present disclosure containing peroxyacetic acid yields an increase in shelf-life of the produce, as compared to produce treated with a single solution selected from the chlorine dioxide solution, the solution containing chlorine, and the solution containing peroxyacetic acid.

Additionally, an electrolyzed ionic solution, such as a brine solution or bicarbonate solution, may be used to further sanitize the produce. Advantageously, the electrolyzed ionic solution can also be used to sanitize the wash water used with the methods for sanitizing produce of the present disclosure. Once sanitized, the wash water can be recycled and/or reused for sanitizing further batches of produce. Accordingly, in certain embodiments, the methods for sanitizing produce of the present disclosure further include treating the produce with an electrolyzed ionic solution before, concurrently, or after treating with a chlorine dioxide solution of the present disclosure, a solution of the present disclosure containing chlorine, and/or a solution of the present disclosure containing peroxyacetic acid.

As disclosed herein, once the produce has been treated with a chlorine dioxide solution of the present disclosure, a solution of the present disclosure containing chlorine and a solution of the present disclosure containing peroxyacetic acid, the produce is washed with potable water to remove residual sanitizer solutions and to reduce the residual chlorine concentration to below 2 ppm chlorine. The washing is preferably performed by spraying the produce. Moreover, washing with potable water preferably occurs before drying the produce for packaging. The produce may be dried by any suitable method known in the art, including but not limited to, spin drying and air drying. Accordingly, in certain embodiments, the methods for sanitizing produce of the present disclosure further include treating the produce with potable water after treating with a chlorine dioxide solution of the present disclosure, a solution of the present disclosure containing chlorine, and a solution of the present disclosure containing peroxyacetic acid. Preferably, the produce is sprayed with potable water. In other embodiments, the methods for sanitizing produce of the present disclosure further include drying the produce after spraying with potable water.

Systems for Sanitizing Produce

Other aspects of the present disclosure relate to systems for sanitizing produce that incorporate treating the produce with a chlorine dioxide solution of the present disclosure, a solution of the present disclosure containing chlorine, and a solution of the present disclosure containing peroxyacetic acid. As disclosed herein, any produce processing plant system known in the art may be used. Suitable systems include, without limitation, systems that utilize open flumes, systems that utilize piping with open and closed loop flumes, and systems that utilize piping with closed loop flumes.

One non-limiting embodiment of a system for sanitizing produce that incorporates treating the produce with a chlorine dioxide solution of the present disclosure, a solution of the present disclosure containing chlorine, and a solution of the present disclosure containing peroxyacetic acid is shown in FIG. 1A. The system depicted in FIG. 1A contains a product flow inclined conveyor belt for introducing produce into an initial wash tank containing a conveyor belt for transporting the produce through the wash tank (Wash Tank #1). The first sanitizer injection pump for introducing the first sanitizer solution, such as a chlorine dioxide solution of the present disclosure, is operably connected to Wash Tank #1 and introduces the first sanitizer solution into Wash Tank #1, thus treating the submerged produce as it progresses on the conveyer belt through Wash Tank #1. The produce then exits Wash Tank #1 onto a conveyor belt that dewaters the produce. The conveyer belt then introduces the produce into a second wash tank containing a conveyor belt for transporting the produce through the wash tank (Wash Tank #2). A second sanitizer injection pump for introducing a second sanitizer solution, such as a solution of the present disclosure containing chlorine, is operably connected to Wash Tank #2 and introduces the second sanitizer solution into Wash Tank #2, thus treating the submerged produce as it progresses on the conveyer belt through Wash Tank #2. The produce then exits Wash Tank #2 onto a conveyor belt that dewaters the produce. The conveyer belt then introduces the produce into a third wash tank containing a conveyor belt for transporting the produce through the wash tank (Wash Tank #3). A third sanitizer injection pump for introducing a third sanitizer solution, such as a solution of the present disclosure containing peroxyacetic acid, is operably connected to Wash Tank #3 and introduces the third sanitizer solution into Wash Tank #3, thus treating the submerged produce as it progresses on the conveyer belt through Wash Tank #3. The produce then exits Wash Tank #3 onto a conveyor belt that is operably connected to a fresh water sprayer. The produce is then sprayed with fresh water and is dewatered as it exits the conveyor belt. The produce can then be transferred to drying and packout systems.

Figure 1B:
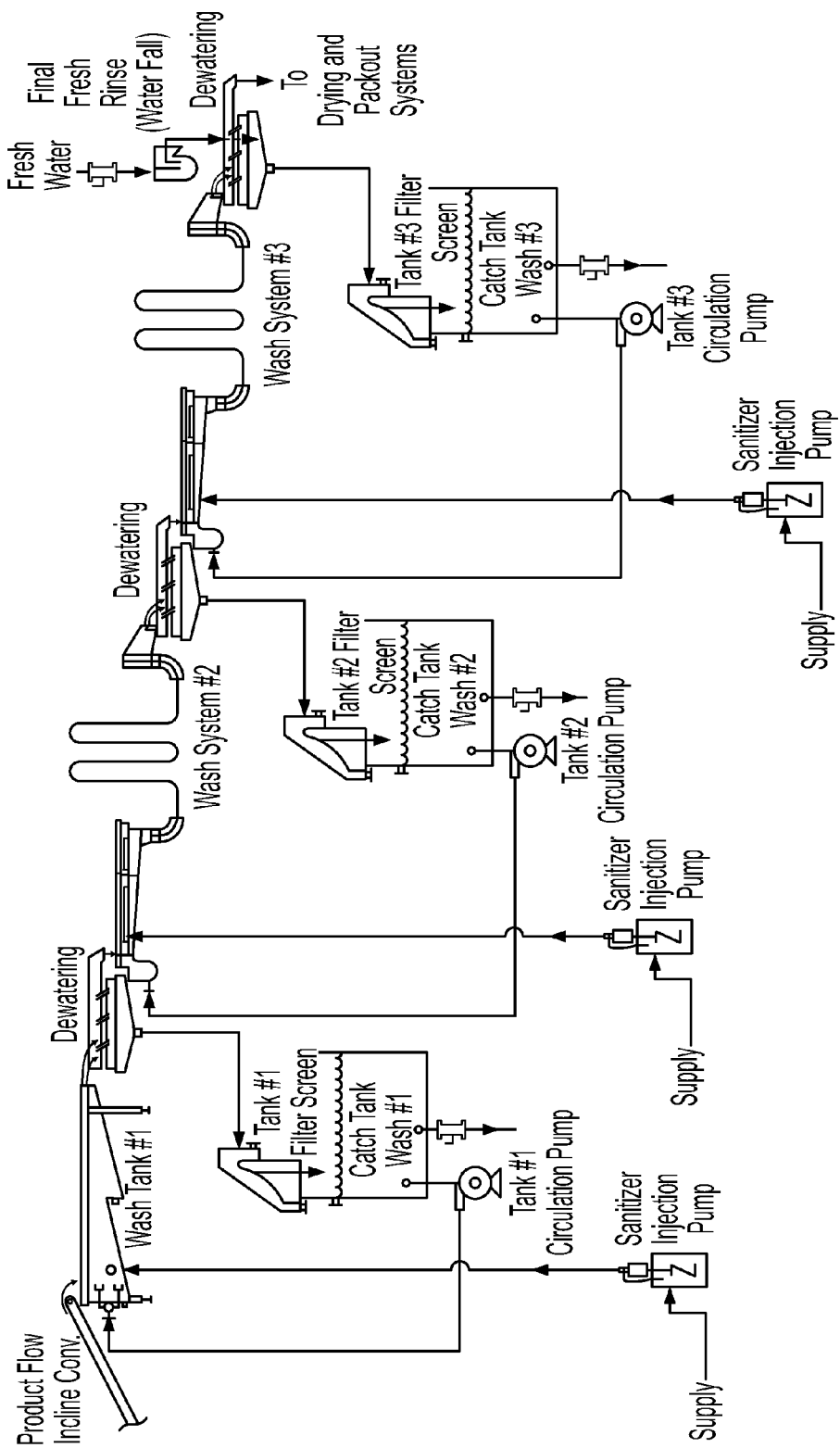
FIG. 1B is a diagram of an exemplary wash system for sanitizing produce that includes one open flume and two closed loop flumes.

Another non-limiting embodiment of a system for sanitizing produce that incorporates treating the produce with a chlorine dioxide solution of the present disclosure, a solution of the present disclosure containing chlorine, and a solution of the present disclosure containing peroxyacetic acid is shown in FIG. 1B. The system depicted in FIG. 1B contains a product flow inclined conveyor belt for introducing produce into an initial wash tank containing a conveyor belt for transporting the produce through the wash tank (Wash Tank #1). The first sanitizer injection pump for introducing the first sanitizer solution, such as a chlorine dioxide solution of the present disclosure, is operably connected to Wash Tank #1 and introduces the first sanitizer solution into Wash Tank #1, thus treating the submerged produce as it progresses on the conveyer belt through Wash Tank #1. The produce then exits Wash Tank #1 onto a conveyor belt that dewaters the produce. The conveyer belt then introduces the produce into an initial closed loop flume system (Wash System #2). A second sanitizer injection pump for introducing a second sanitizer solution, such as a solution of the present disclosure containing chlorine, is operably connected to Wash System #2 and introduces the second sanitizer solution into Wash System #2, thus treating the enclosed produce as it flows through Wash System #2. The produce then exits Wash System #2 by positive flow onto a conveyor belt that dewaters the produce. The conveyer belt then introduces the produce into a second closed loop flume system (Wash System #3). A third sanitizer injection pump for introducing a third sanitizer solution, such as a solution of the present disclosure containing peroxyacetic acid, is operably connected to Wash System #3 and introduces the third sanitizer solution into Wash System #3, thus treating the enclosed produce as it flows through Wash System #3. The produce then exits Wash System #3 by positive flow onto a conveyor belt that is operably connected to a fresh water sprayer. The produce is then sprayed with fresh water and is dewatered as it exits the conveyor belt. The produce can then be transferred to drying and packout systems.

Figure 1C:
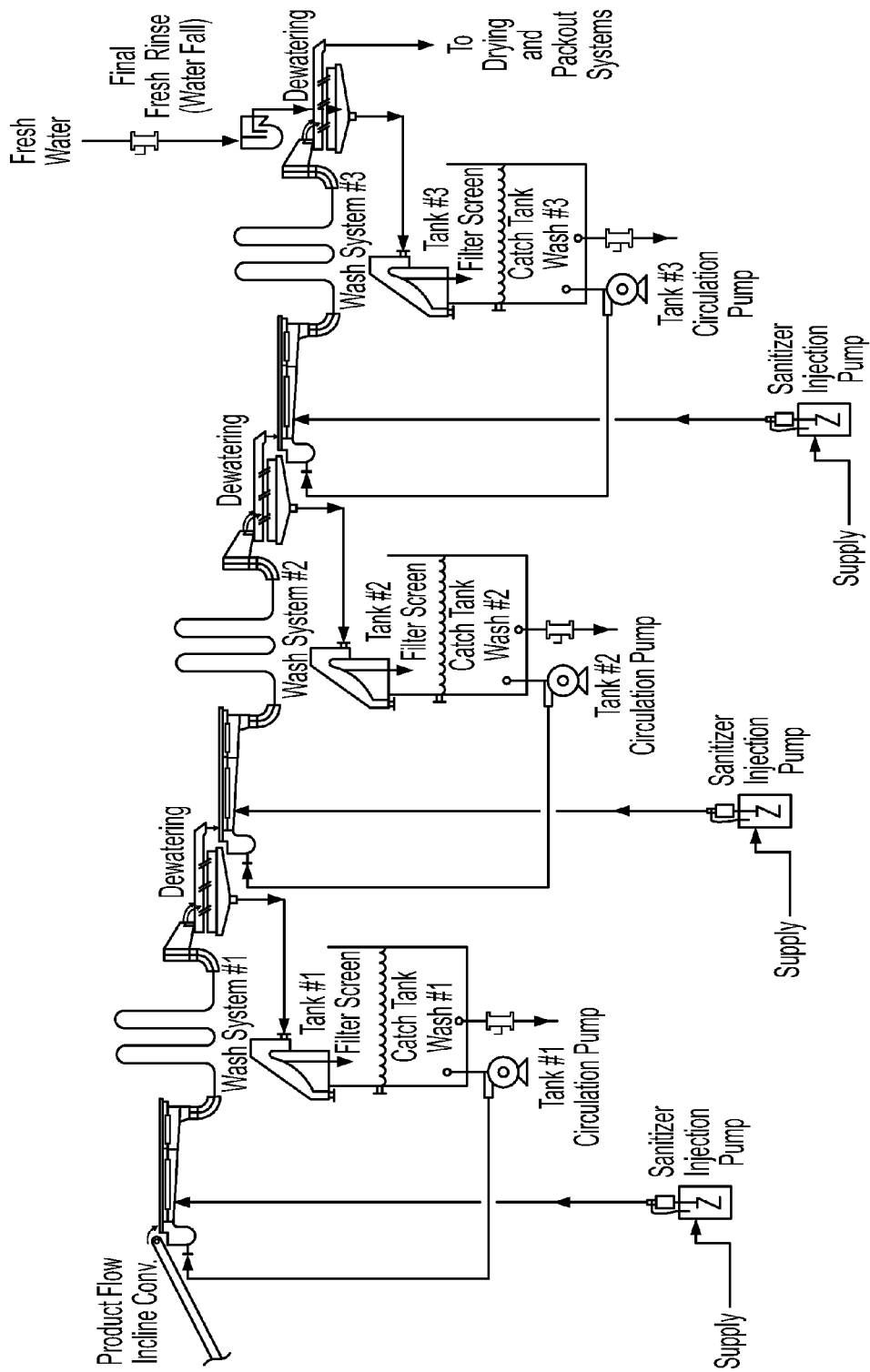
FIG. 1C is a diagram of an exemplary wash system for sanitizing produce that includes three closed loop flumes.

A further non-limiting embodiment of a system for sanitizing produce that incorporates treating the produce with a chlorine dioxide solution of the present disclosure, a solution of the present disclosure containing chlorine, and a solution of the present disclosure containing peroxyacetic acid is shown in FIG. 1C. The system depicted in FIG. 1C contains a product flow inclined conveyor belt for introducing produce into an initial closed loop flume system (Wash System #1). The first sanitizer injection pump for introducing the first sanitizer solution, such as a chlorine dioxide solution of the present disclosure, is operably connected to Wash System #1 and introduces the first sanitizer solution into Wash System #1, thus treating the enclosed produce as it flows through Wash System #1. The produce then exits Wash System #1 by positive flow onto a conveyor belt that dewaters the produce. The conveyer belt then introduces the produce into a second closed loop flume system (Wash System #2). A second sanitizer injection pump for introducing a second sanitizer solution, such as a solution of the present disclosure containing chlorine, is operably connected to Wash System #2 and introduces the second sanitizer solution into Wash System #2, thus treating the enclosed produce as it flows through Wash System #2. The produce then exits Wash System #2 by positive flow onto a conveyor belt that dewaters the produce. The conveyer belt then introduces the produce into a third closed loop flume system (Wash System #3). A third sanitizer injection pump for introducing a third sanitizer solution, such as a solution of the present disclosure containing peroxyacetic acid, is operably connected to Wash System #3 and introduces the third sanitizer solution into Wash System #3, thus treating the enclosed produce as it flows through Wash System #3. The produce then exits Wash System #3 by positive flow onto a conveyor belt that is operably connected to a fresh water sprayer. The produce is then sprayed with fresh water and is dewatered as it exits the conveyor belt. The produce can then be transferred to drying and packout systems.

The following Examples are merely illustrative and are not meant to limit any aspects of the present disclosure in any way.

EXAMPLES

Example 1

Sanitizing Produce by Treating with a Chlorine Dioxide Solution, a Chlorine Solution, and an Peroxyacetic Acid Solution Introduction The following Example demonstrates that a triple wash treatment utilizing a chlorine dioxide ($ClO_2$) solution, a chlorine solution ($Cl_2$), and a peroxyacetic acid solution (PAA) is successful in sanitizing leafy vegetables, such as lettuces and spinach. The triple wash treatment described below includes the use of the sanitizers chlorine dioxide ($ClO_2$), chlorine solution ($Cl_2$), and peroxyacetic acid (PAA). Without wishing to be bound by theory, it is believed that use of the chlorine dioxide solution dissolves or otherwise removes bacterial biofilms present on leafy vegetables that protect the bacteria from the effects of sanitizers. Once the biofilm is removed, chlorine dioxide and chlorine solutions sanitize the leafy vegetable by eliminating the bacteria. The use of the PAA solution not only further sanitizes the leafy vegetables, but it is also believed that residual acetic acid in the PAA solution acts as a trap to inactivate the chlorine dioxide, making it safer to use the chlorine dioxide solution.

The results depicted below indicate that the sequential addition of $ClO_2$, $Cl_2$, and PAA provides at least a 4 log unit reduction in microbial load, when compared with a chlorine-only treatment control that only provides a 2 log unit reduction. Advantageously, the results demonstrated that the triple wash treatment provides a greater amount of sanitation in commercial produce processing than previously available in the fresh produce industry.

Materials and Methods

Bench-Top Triple Wash Treatment

Sample Preparation

Unwashed product was collected and used for all bench-top testing. Commodity Romaine lettuce, and Iceberg lettuce were collected post-transslicer. Spring Mix lettuces and commodity spinach were collected as unwashed and already-proportioned. 10 replicates (minimum 25 g) of raw, unwashed product were collected for microbial load analysis.

Solution Preparation

Separate chlorine dioxide ($ClO_2$), chlorine ($Cl_2$), and peroxyacetic acid (PAA) solution dip stations were prepared with target concentrations of each chemical in a total volume of 20 L.

The target concentration for $ClO_2$ was 25 ppm. This solution was prepared by diluting concentrate solutions of $ClO_2$. The concentrate solutions of $ClO_2$ were generated from packets of Selectrocide™ 2L500 and Selectrocide™ A-15. The Selectrocide™ 2L500 was used to generate 2 liters of 500 ppm concentrate $ClO_2$ solution and the Selectrocide™ A-15 was used to generate 20 liters of 800 ppm concentrate $ClO_2$ solution. The $ClO_2$ concentration of the final working solution was confirmed using an HACH Spectrophotomer DR 2800 (program 76).

The target concentration for $Cl_2$ was 40 ppm. This solution was prepared using sodium hypochlorite from Ecolab, Inc. The $Cl_2$ concentration was confirmed using a HACH Spechtrophotometer DR 2800 (program 80).

The target concentration for PAA was 80 ppm. This solution was prepared using Sanidate® 5.0 (5.25% PAA). The PAA concentration was confirmed using an Ecolab, Inc. Per-acid/Peroxide #311 Test Kit.

Triple Wash Dipping Procedure

Product was dipped at a rate of 908 g/20 L (2 lbs/20 L) and dipped in solution in the following orders:
    a. 10 seconds in 25 ppm $ClO_2$
    b. 90 seconds in 40 ppm $Cl_2$
    c. 30 seconds in 80 ppm PAA; or
    a. 30 seconds in 25 ppm $ClO_2$
    b. 90 seconds in 40 ppm $Cl_2$
    c. 30 seconds in 80 ppm PAA; or
    a. 30 seconds in 25 ppm $ClO_2$
    b. 90 seconds in 80 ppm PAA
    c. 30 seconds in 40 ppm $Cl_2$; or
    a. 10 seconds in 80 ppm PAA
    b. 90 seconds in 25 ppm $ClO_2$
    c. 30 seconds in 40 ppm $Cl_2$; or
    a. 10 seconds in 80 ppm PAA
    b. 90 seconds in 40 ppm $Cl_2$
    c. 30 seconds in 25 ppm $ClO_2$ It should be noted that all concentrations listed above are target concentrations.

The ClO$_2$ was performed at a pH that ranged from approximately 4-9. However, ClO$_2$ is effective over a broad range of pH, and so the pH was not controlled. The Cl$_2$ wash step was performed at a controlled pH of approximately 6.5+/−0.2 pH units. The PAA wash step was performed at a pH that ranged from approximately 3-4.

Product was agitated while dipped to simulate processing, retrieved using a sterilized basket, and placed onto sterilized tray between dips. Both basket and tray were sterilized using 70% ethanol.

For each trial, 5 replicates (25 g minimum) were collected following each dip step for microbial load analysis. Product collected for microbial load analysis was not dried before collection.

Microbial Load Analysis

All samples collected for microbial load analysis (i.e., both unwashed and treated sample) were sent to a third party Food Safety Lab (IEH Laboratories in Salinas, Calif.) for Total Aerobic Plate Count (APC) analysis using standard FDA BAM techniques. APC results are reported as colony forming units per gram (CFU/g.).

Average APC log value for each treatment was calculated by calculating the log value of the APC count for each replicate in a given treatment, and then averaging the log values for all replicates in each treatment.

Average APC log unit reduction was based on the average APC log value of the raw, untreated control. The average APC log value of each treatment was subtracted from the average APC log value of control to obtain the average APC log unit reduction for a given treatment. For example, if the average APC log value of the control is 3.77 and the average APC log value of the triple wash treatment is 2.01, then the average APC log unit reduction for the triple wash treatment would be 3.77−2.01=1.76.

Results

Triple Wash Treatment of Romaine Lettuce

For Treatment 1, unwashed, cut Romaine was used for the trial. Samples of raw (i.e., unwashed) Romaine and Romaine following final dip were collected in triplicate and APC testing was performed. Dips were completed as follows: a) 10 s dip in 80 ppm PAA; b) 90 s dip in 25 ppm ClO$_2$; and c) 30 s dip in 40 ppm Cl$_2$.

For Treatment 2, unwashed, cut Romaine lettuce was used for the trial. Samples of raw (i.e., unwashed) Romaine and Romaine following final dip were collected in triplicate and APC testing was performed. Dips were completed as follows: a) 30 s dip in 25 ppm ClO$_2$; b) 90 s dip in 40 ppm Cl$_2$; and c) 30 s dip in 80 ppm PAA.

Figure 2A:
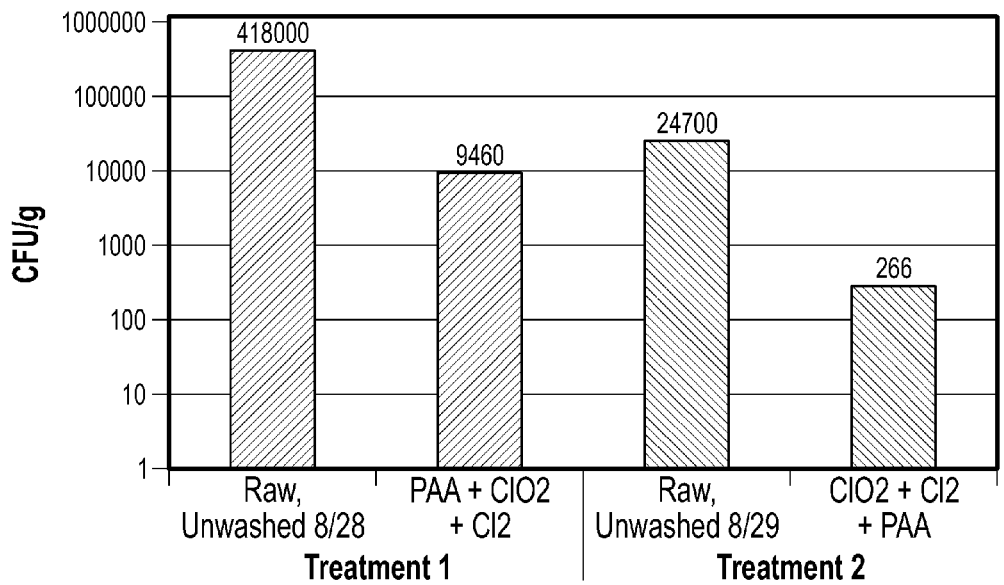
FIG. 2A is a bar graph depicting average Aerobic Plate Counts (APC) on Romaine lettuce from 2 treatments with $ClO_2$, $Cl_2$, and PAA.
Figure 2B:
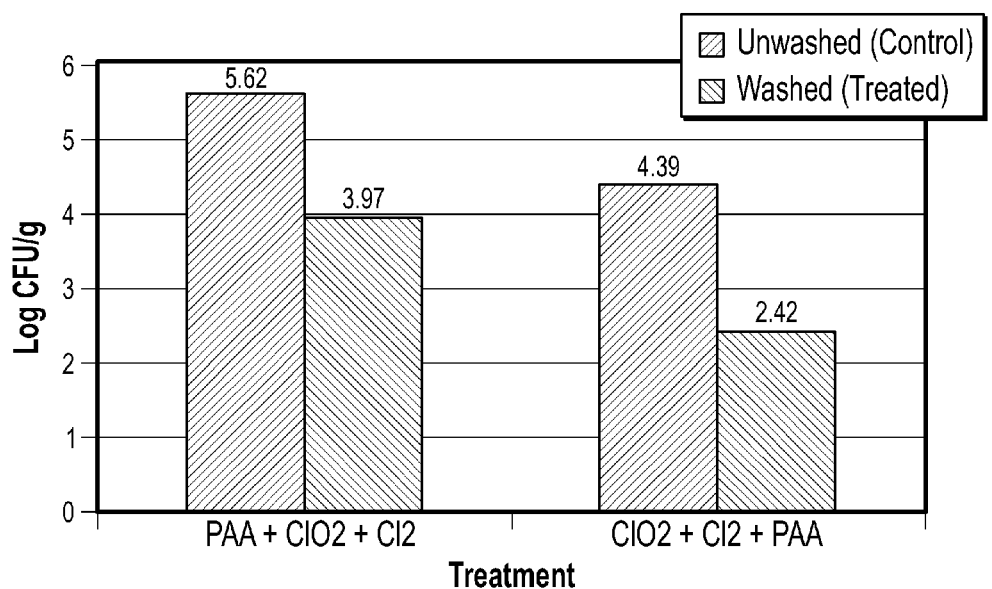
FIG. 2B is a bar graph depicting average Aerobic Plate Count (APC) log unit reduction on Romaine lettuce from 2 treatments with $ClO_2$, $Cl_2$, and PAA. Treatment 1 was performed in the following order: 80 ppm PAA for 10 s, 25 ppm $ClO_2$ for 90 s, then 40 ppm $Cl_2$ for 30 s. Treatment 2 was performed in the following order: 25 ppm $ClO_2$ for 30 s, 40 ppm $Cl_2$ for 90 s, then 80 ppm PAA for 30 s.

As shown in FIGS. 2A and 2B, the raw control in Treatment 1 had an average APC of 41,800 CFU/g (5.62 log units), while the triple wash treatment (PAA+ClO2+Cl2) had an average APC of 9,460 CFU/g (3.97 log units). This represents a log unit reduction of approximately 1.64 for the triple wash treatment.

The raw control in Treatment 2 had an average APC of 24,700 CFU/g (4.39 log units), while the triple wash treatment (ClO2+Cl2+PAA) had an average APC of 266 CFU/g (2.42 log units) (FIGS. 2A and 2B). This represents a log unit reduction of approximately 1.97 for the triple wash treatment.

Triple Wash Treatment Comparison with Triple Chlorine Treatment

Unwashed, cut Romaine lettuce used for the trial. Samples of raw (i.e., unwashed) Romaine (10 samples), and Romaine following dip 1, following dip 2 and after the final dip (5 samples per dipped variable) were collected and APC testing was performed.

Triple wash dips were completed as follows: a) 30 s dip in 25 ppm ClO$_2$; b) 90 s dip in 40 ppm Cl$_2$; and c) 30 s dip in 80 ppm PAA.

Triple chlorine treatment dips were completed as follows: a) 30 s dip in 40 ppm Cl$_2$; b) 90 s dip in 40 ppm Cl$_2$; and c) 30 s dip in 40 ppm Cl$_2$.

Figure 3A:
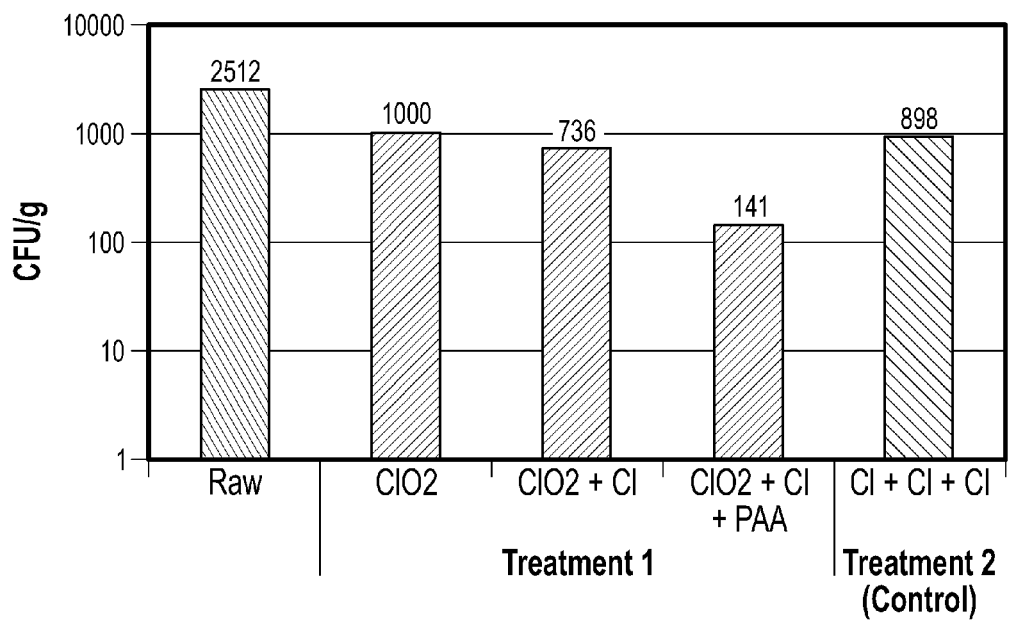
FIG. 3A is a bar graph depicting average Aerobic Plate Counts (APC) on Romaine lettuce from 1 treatment with $ClO_2$, $Cl_2$, and PAA, and 1 control treatment with $Cl_2$ alone.

As shown in FIG. 3A, the raw control in had an average APC of 2,512 CFU/g, the triple wash treatment after the first dip (ClO2) had an average APC of 1,000 CFU/g, the triple wash treatment after the second dip (Cl2) had an average APC of 736 CFU/g, and the triple wash treatment after the final dip (PAA) had an average APC of 141 CFU/g. In contrast, the triple chlorine treatment had an average APC of 898 CFU/g (FIG. 3A).

Figure 3B:
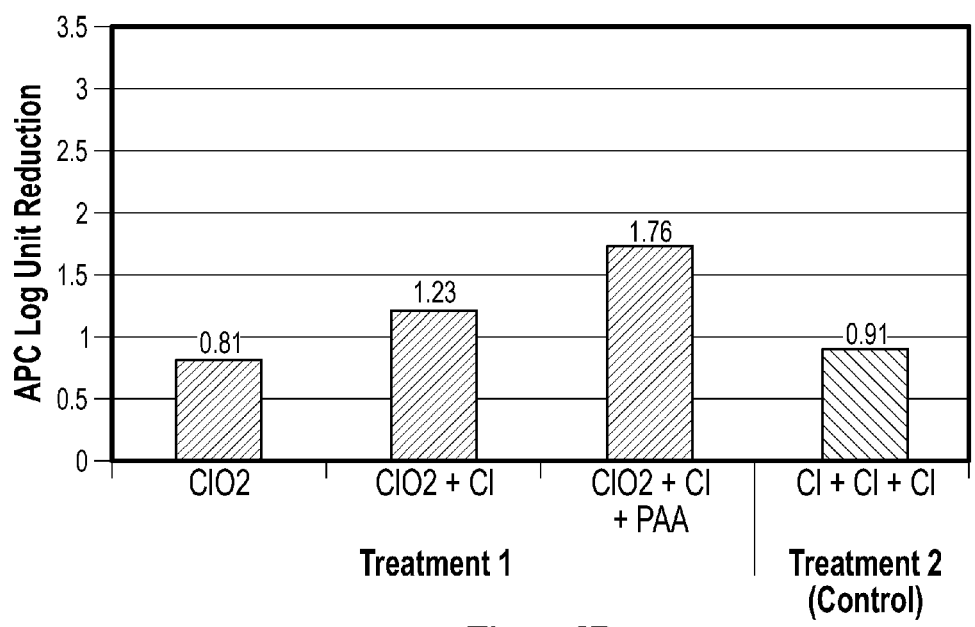
FIG. 3B is a bar graph depicting average Aerobic Plate Count (APC) log unit reduction on Romaine lettuce from 1 treatment with $ClO_2$, $Cl_2$, and PAA, and 1 control treatment with $Cl_2$ alone. Treatment 1 was performed in the following order: 25 ppm $ClO_2$ for 30 s, 40 ppm $Cl_2$ for 90 s, then 80 ppm PAA for 30 s. Treatment 2 (Control) was performed in the following order: 40 ppm $Cl_2$ for 30 s, 40 ppm $Cl_2$ for 90 s, then 40 ppm $Cl_2$ for 30 s.

The average log unit reduction, compared to the raw control, for the triple wash treatment after each dip was then calculated and compared to that of the triple chlorine treatment. As shown in FIG. 3B, the triple wash treatment after the first dip (ClO2) had an average APC log unit reduction of approximately 0.81; the triple wash treatment after the second dip (Cl2) had an average APC log unit reduction of approximately 1.23, and the triple wash treatment after the final dip (PAA) had an average APC log unit reduction of approximately 1.76. In contrast, the triple chlorine treatment had an average APC log unit reduction of approximately 0.91.

The results depicted in FIG. 3 indicate that each step of the triple wash treatment (ClO$_2$, Cl$_2$, PAA) has at least an additive, if not synergistic effect on microbial load reduction. Moreover, compared to the triple chlorine treatment, the triple wash treatment resulted in approximately an additional log reduction in microbial load, as evaluated by APC counts (FIG. 3B).

Comparison of Order of PAA and Cl$_2$ in Triple Wash Treatment

Unwashed, cut Romaine was used for the trial. For each treatment, samples of raw (i.e., unwashed) Romaine (10 samples), and Romaine following dip 1, dip 2, and final dip (5 samples per dipped variable) were collected and APC testing was performed.

Triple wash dips were for Treatment 1 were completed as follows: a) 30 s dip in 25 ppm ClO$_2$; b) 90 s dip in 40 ppm Cl$_2$; and c) 30 s dip in 80 ppm PAA.

Triple wash dips were for Treatment 2 were completed as follows: a) 30 s dip in 25 ppm ClO$_2$; b) 90 s dip in 80 ppm PAA; and c) 30 s dip in 40 ppm Cl$_2$.

Figure 4:
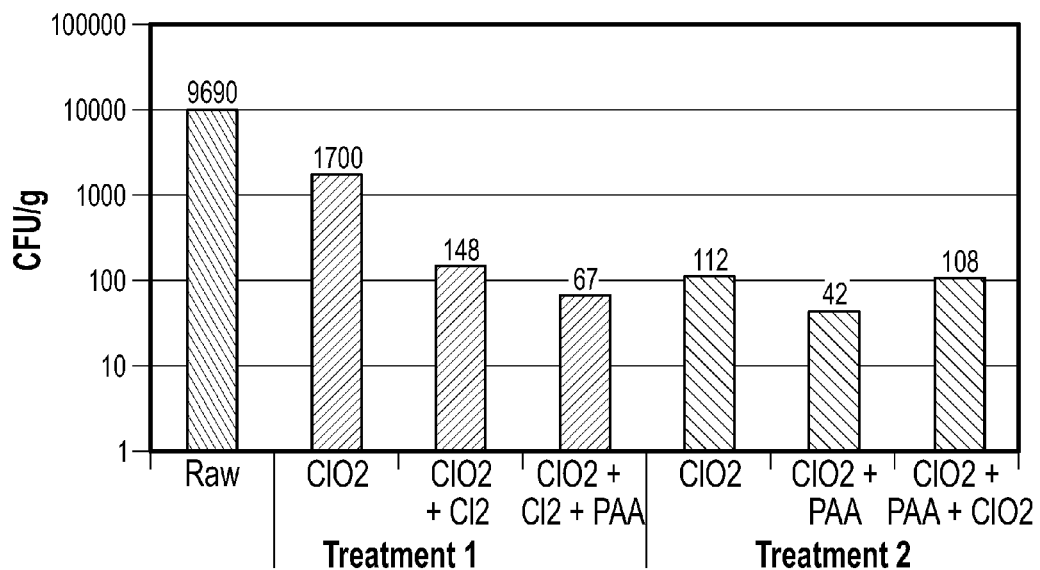
FIG. 4 is a bar graph depicting average Aerobic Plate Counts (APC) on Romaine lettuce from 2 treatments with $ClO_2$, $Cl_2$, and PAA. Treatment 1 was performed in the following order: 25 ppm $ClO_2$ for 30 s, 40 ppm $Cl_2$ for 90 s, then 80 ppm PAA for 30 s. Treatment 2 was performed in the following order: 25 ppm $ClO_2$ for 30 s, 80 ppm PAA for 90 s, then 40 ppm $Cl_2$ for 30 s.

The raw control in had an average APC of 9,690 CFU/g (FIG. 4)

For Treatment 1, the triple wash treatment after the first dip (ClO2) had an average APC of 1,700 CFU/g, the triple wash treatment after the second dip (Cl2) had an average APC of 148 CFU/g, and the triple wash treatment after the final dip (PAA) had an average APC of 67 CFU/g (FIG. 4).

For Treatment 2, the triple wash treatment after the first dip (ClO2) had an average APC of 112 CFU/g, the triple wash treatment after the second dip (PAA) had an average APC of 42 CFU/g, and the triple wash treatment after the final dip (Cl2) had an average APC of 108 CFU/g (FIG. 4).

The raw Romaine lettuce samples have very variable initial APC counts. As such, and without wishing to be bound by theory, it is believed that this high variability leads to variability in microbial load reduction after treatments. It is further believed that the variability in APC counts seen after the first dip in Treatment 1 and Treatment 2 is due to the variability in initial APC counts of raw Romaine samples.

The results indicate that triple dip order in Treatment 1 had a greater overall log reduction following the last dip (2.2 log unit reduction) than Treatment 2 following the last dip (1.88 log unit reduction).

Triple Wash Treatment of Spring Mix Lettuces

Unwashed Spring Mix after proportion mixing was used for the trial. For each treatment, samples of raw (i.e., unwashed) product (10 raw samples) and samples following final dip (6 samples per treatment) were collected and APC testing was performed.

Triple wash dips for Treatment 1 were completed as follows: a) 10 s dip in 25 ppm $ClO_2$; b) 90 s dip in 40 ppm $Cl_2$; and c) 30 s dip in 80 ppm PAA. Triple wash dips for Treatment 2 were completed as follows: a) 10 s dip in 80 ppm PAA; b) 90 s dip in 40 ppm $Cl_2$; and c) 30 s dip in 25 ppm $ClO_2$.

A triple chlorine treatment was also included as a control. For triple chlorine treatment, the dips were completed as follows: a) 10 s or 30 s dip in 40 ppm $Cl_2$; b) 90 s dip in 40 ppm $Cl_2$; and c) 30 s dip in 40 ppm $Cl_2$.

Figure 5:
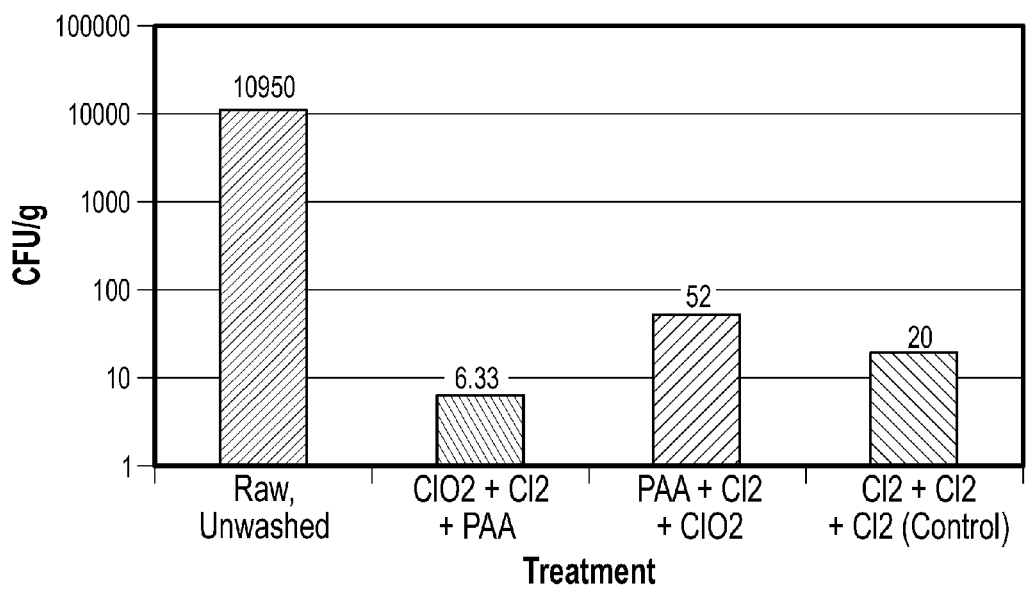
FIG. 5 is a bar graph depicting average Aerobic Plate Counts (APC) on Spring Mix lettuces from 2 treatments with $ClO_2$, $Cl_2$, and PAA. Treatment 1 was performed in the following order: 25 ppm $ClO_2$ for 10 s, 40 ppm $Cl_2$ for 90 s, then 80 ppm PAA for 30 s. Treatment 2 was performed in the following order: 80 ppm PAA for 10 s, 40 ppm $Cl_2$ for 90 s, then 25 ppm $ClO_2$ for 30 s.

As shown in FIG. 5, the raw control in had an average APC of 10,950 CFU/g.

For Treatment 1, the triple wash Treatment 1 ($ClO2+Cl2+PAA$) had an average APC of 6.33 CFU/g, and the triple wash Treatment 2 ($PAA+Cl2+ClO2$) had an average APC of 52 CFU/g (FIG. 5). The triple chlorine treatment ($Cl2+Cl2+Cl2$) had an average APC of 20 CFU/g (FIG. 5).

Without wishing to be bound by theory, it is believed that the low APC count seen with the triple chlorine control treatment is due to the variability in initial APC counts of raw (unwashed) samples.

The results depicted in FIG. 5 indicate that Treatment 1 showed an extra 1 log unit reduction (3.31 log unit reduction) as compared to Treatment 2 (2.24 log unit reduction). Moreover, Treatment 1 showed an extra 0.5 log reduction as compared to the triple chlorine control (2.8 log reduction).

Triple Wash Treatment of Iceberg Lettuce

Unwashed Iceberg lettuce was used for the trial. For each treatment, 10 samples of raw (i.e., unwashed) product (raw samples) and 10 samples following triple wash treatment were collected and APC testing was performed.

Triple wash dips were completed as follows: a) 10 s dip in 25 ppm $ClO_2$; b) 90 s dip in 40 ppm $Cl_2$; and c) 30 s dip in 80 ppm PAA.

A triple chlorine treatment was also included as a control. For triple chlorine treatment, the dips were completed as follows: a) 30 s dip in 40 ppm $Cl_2$; b) 90 s dip in 40 ppm $Cl_2$; and c) 30 s dip in 40 ppm $Cl_2$.

Figure 6:
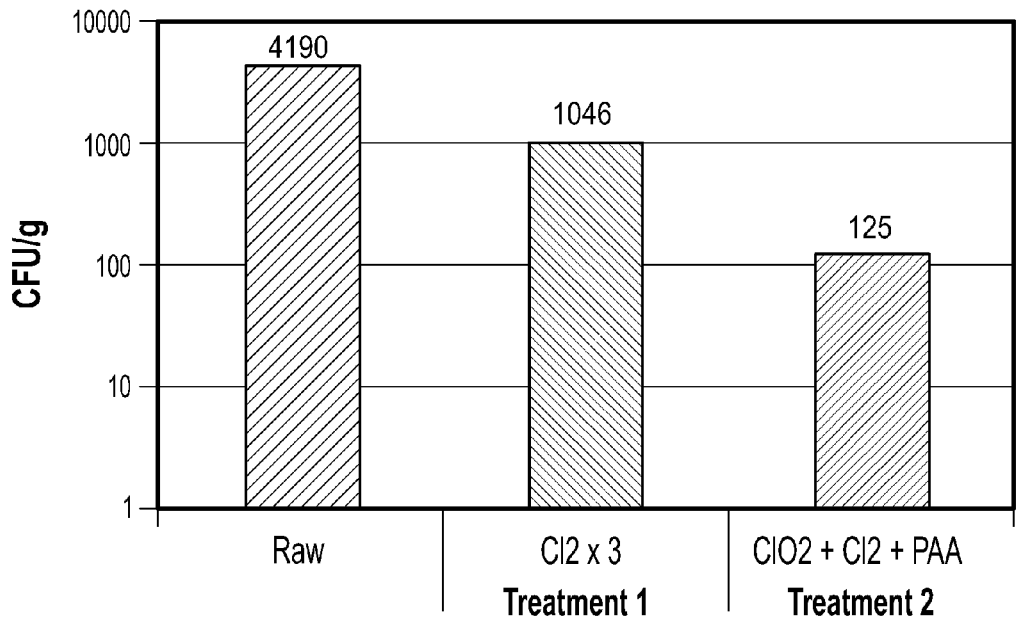
FIG. 6 is a bar graph depicting average Aerobic Plate Counts (APC) on shredded Iceberg lettuce from 2 treatments with $ClO_2$, $Cl_2$, and PAA. Treatment 1 was performed in the following order: 40 ppm $Cl_2$ for 10 s, 40 ppm $Cl_2$ for 90 s, then 40 ppm $Cl_2$ for 30 s. Treatment 2 was performed in the following order: 25 ppm $ClO_2$ for 10 s, 40 ppm $Cl_2$ for 90 s, then 80 ppm PAA for 30 s.

The results are depicted in Table 1 and FIG. 6.

TABLE 1

| Sample Treatment | APC (CFU/g) |
| --- | --- |
| Raw | 4,190 CFU/g |
| Chlorine control | 1,046 CFU/g |
| Triple wash | 125 CFU/g |

The results in Table 1 and FIG. 6 indicate that the triple wash treatment resulted in approximately an additional 1 log unit reduction in bacterial load, as compared to the triple chlorine control.

Triple Wash Treatment of Spinach

Unwashed spinach was used for the trial. For each treatment, samples of raw (i.e., unwashed) product (10 raw samples), water wash control (5 samples), processing plant control (5 samples), and samples following triple wash treatment (5 samples per treatment) were collected and APC testing was performed.

Triple wash dips were completed as follows: a) 10 s dip in 25 ppm $ClO_2$; b) 90 s dip in 40 ppm $Cl_2$; and c) 30 s dip in 80 ppm PAA.

A triple chlorine treatment was also included as a control. For triple chlorine treatment, the dips were completed as follows: a) 30 s dip in 40 ppm $Cl_2$; b) 90 s dip in 40 ppm $Cl_2$; and c) 30 s dip in 40 ppm $Cl_2$.

Figure 7:
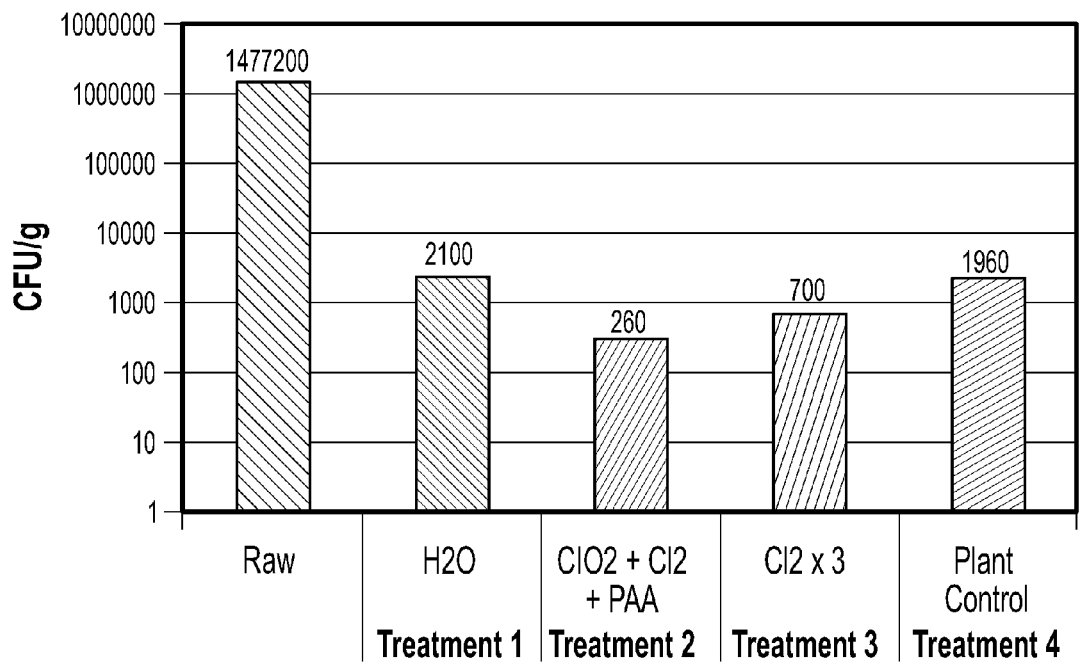
FIG. 7 is a bar graph depicting average Aerobic Plate Counts (APC) on spinach from 4 treatments with $H_2O$, $ClO_2$, $Cl_2$, and PAA. Treatment 1 was performed in the following order: $H_2O$ for 10 s, $H_2O$ for 90 s, then $H_2O$ for 30 s. Treatment 2 was performed in the following order: 25 ppm $ClO_2$ for 10 s, 40 ppm $Cl_2$ for 90 s, then 80 ppm PAA for 30 s. Treatment 3 was performed in the following order: 40 ppm $Cl_2$ for 10 s, 40 ppm $Cl_2$ for 90 s, then 40 ppm $Cl_2$ for 30 s. Treatment 4 was performed in the following order: 50 s wash with 10 ppm $Cl_2$ in a wash tank, then a final spray with 90-150 ppm $Cl_2$ for 1-3 s.

The results are depicted in Table 2 and FIG. 7.

TABLE 2

| Sample Treatment | APC (CFU/g) |
| --- | --- |
| Raw control | 1,477,200 CFU/g |
| Water wash control | 2,100 CFU/g |
| Processing plant control | 1,960 CFU/g |
| Chlorine control | 700 CFU/g |
| Triple wash | 260 CFU/g |

The results in Table 2 and FIG. 7 indicate that the triple wash treatment resulted in a significant reduction in bacterial load, as compared to the processing plant control and the water wash control.

Additionally, the triple wash treatment was better than the chlorine control in reducing bacterial load. It should be noted that raw spinach samples contain a lot of dirt. As such, and without wishing to be bound by theory, it is believed that the bacterial load reduction seen with the water wash control is due to the removal of the dirt from the spinach samples.

Analysis of Sanidate® 5.0 Solution

In the results described above, Sanidate® 5.0 was used as the commercial source of peroxyacetic acid (PAA) for the triple wash treatments. However, Sanidate® 5.0 contains approximately 23% of hydrogen peroxide ($H_2O_2$), while only containing approximately 5.25% of PAA. Accordingly, $H_2O_2$ at 350 ppm, a concentration corresponding to the 23% present in Sanidate® 5.0, was tested to determine whether the $H_2O_2$ contributes to the microbial load reduction seen with the triple wash treatment.

Unwashed Romaine lettuce was used for the trial. Samples of raw (i.e., unwashed) lettuce and samples following each wash treatment were collected and APC testing was performed. The treatments included a chlorine triple dip control ($Cl_2$), a Sanidate® 5.0 triple dip treatment, and a hydrogen peroxide ($H_2O_2$) triple dip treatment. The first dip lasted 10 seconds, the second dip lasted 90 seconds, and the third dip lasted 30 seconds.

Figure 8:
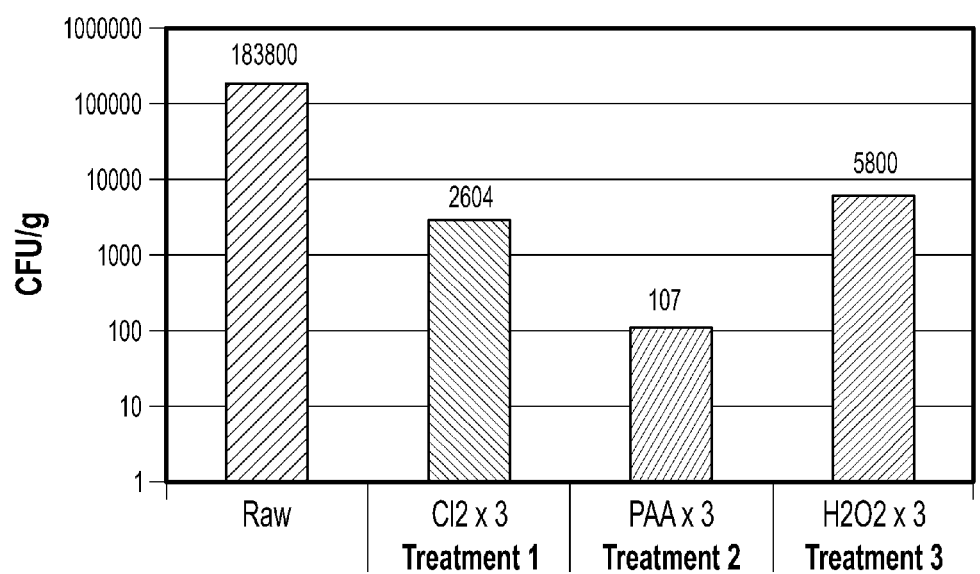
FIG. 8 is a bar graph depicting average Aerobic Plate Counts (APC) on Romaine lettuce from 3 treatments with $Cl_2$, $H_2O_2$, and Sanidate® 5.0 (5.25% PAA). Treatment 1 was performed in the following order: 40 ppm $Cl_2$ for 10 s, 40 ppm $Cl_2$ for 90 s, then 40 ppm $Cl_2$ for 30 s. Treatment 2 was performed in the following order: 80 ppm PAA for 10 s, 80 ppm PAA for 90 s, then 80 ppm PAA for 30 s. Treatment 3 was performed in the following order: 23% $H_2O_2$ solution for 10 s, 23% $H_2O_2$ solution for 90 s, and then 23% $H_2O_2$ solution for 30 s.

The results are depicted in Table 3 and FIG. 8.

TABLE 3

| Sample Treatment | APC (CFU/g) |
| --- | --- |
| Raw control | 183,800 CFU/g |
| $Cl_2$ control | 2,604 CFU/g |
| Sanidate ® 5.0 (PAA) | 107 CFU/g |
| $H_2O_2$ | 5,800 CFU/g |

The results in Table 3 and FIG. 8 indicate that the hydrogen peroxide does not contribute significantly to the bacterial load reduction effects of Sanidate® 5.0, as the hydrogen peroxide only reduced the bacterial load (5,800 CFU/g) to level comparable to that of the chlorine control (2,604 CFU/g). However, the Sanidate® 5.0 (PAA) reduced the bacterial load to 107.2 CFU/g, which is approximately an additional 1 log unit reduction in bacterial load as compared to the hydrogen peroxide.

Conclusions

The above results show that the triple wash treatment yields total APC counts after treatment of lettuce and spinach that were in the low hundreds, and often lower than 100 CFU/g. This is a significant result, as it is unheard of that sanitizing treatments utilized in fresh produce processing plants yield such low total APC counts after treatment.

It should be noted that the raw lettuce and spinach that were used as controls were very variable in the amount of soil contamination and resulting bacterial load. This resulted in the raw controls having very variable initial APC counts. As such, and without wishing to be bound by theory, it is believed that this high variability leads to variability in microbial load reduction after treatments. However, the results show that despite these difficulties, it is clear that the triple wash treatment results in a significant reduction in total APC counts after treatment.

Moreover, the results also show that the triple wash treatment with $ClO_2$, $Cl_2$, and PAA yields up to a 3-4 log unit reduction in microbial load of lettuce and spinach. This is in contrast to previous results showing that treatment with $ClO_2$ alone yields a 2-2.5 log unit reduction in microbial load, treatment with $Cl_2$ alone yields a 1.5-2.5 log unit reduction in microbial load, and treatment with PAA yields a 2-2.5 log unit reduction in microbial load. While it has been shown that PAA can yield a 2-2.5 log reduction in microbial load, this has only been shown in combination with lactic acid using a stomacher process to gently massage lettuce samples in solution prior to determining the microbial count of the resulting solution. It is believed that the bacteria will be massaged off the lettuce and into the solution. However, in the case of lactic acid, it appears that treating with lactic acid strips the cuticle layer off the lettuce leaf, which allows bacteria to stick to the leaves. It is thus believed that if more bacteria are sticking to the leaves, then less are massaged into the solution from the stomaching process. This results in false low microbial counts that are not truly representative of the microbial load present on the lettuce. Moreover, treatment with a combination of $ClO_2$ and $Cl_2$, yields a 1.5-2.5 log unit reduction in microbial load, a combination of $ClO_2$ and PAA yields a 2-2.5 log unit reduction in microbial load, and a combination of PAA and $Cl_2$ yields approximately a 3 log unit reduction in microbial load.

Based on these previous results, it is clear that the triple wash treatment utilizing $ClO_2$, $Cl_2$, and PAA in a sequential and unique order yields a synergistic reduction in microbial load.

It is also noted that the use of $ClO_2$, $Cl_2$, and PAA is approved for use with certified organic produce, as such the triple wash treatment can also be used to sanitize organic produce.

Example 2

Efficacy of Triple Wash Treatment for Sanitizing Leafy Greens Inoculated With Pathogenic Bacteria Introduction The following Example demonstrates the efficacy of a triple wash treatment utilizing a chlorine dioxide ($ClO_2$) solution, a chlorine solution ($Cl_2$), and a peroxyacetic acid solution (PAA) in reducing microbial load in leafy vegetables inoculated with *E. coli*, *Salmonella* and *Listeria*, common pathogenic contaminants.

Materials and Methods

Log Reduction Analysis of Background Bacteria

Figure 9A:
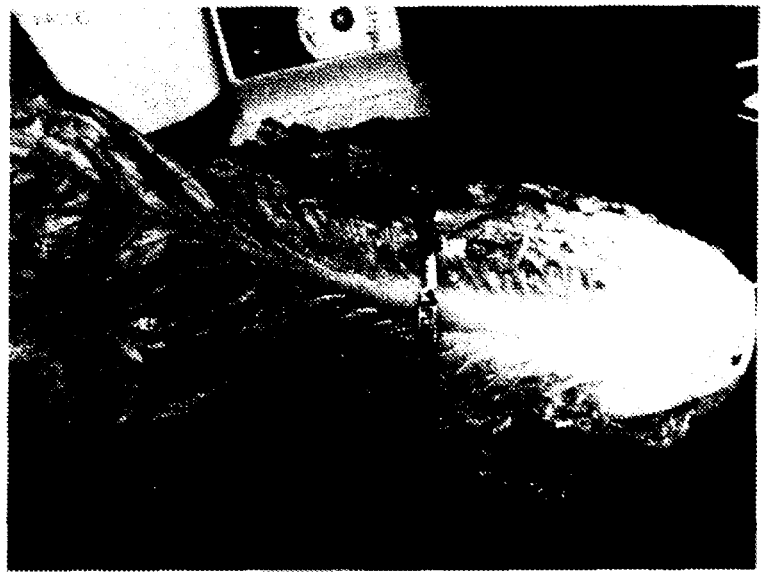
FIG. 9A depicts an example of commodity Romaine lettuce from a grocery store.

Commodity lettuce (FIG. 9A), such as Romaine lettuce (i.e., product that has not been subjected to a sanitization treatment and/or bagged under modified atmospheric packaging), was used for each trial, and stored at 4° C. until analyzed.

Figure 9B:
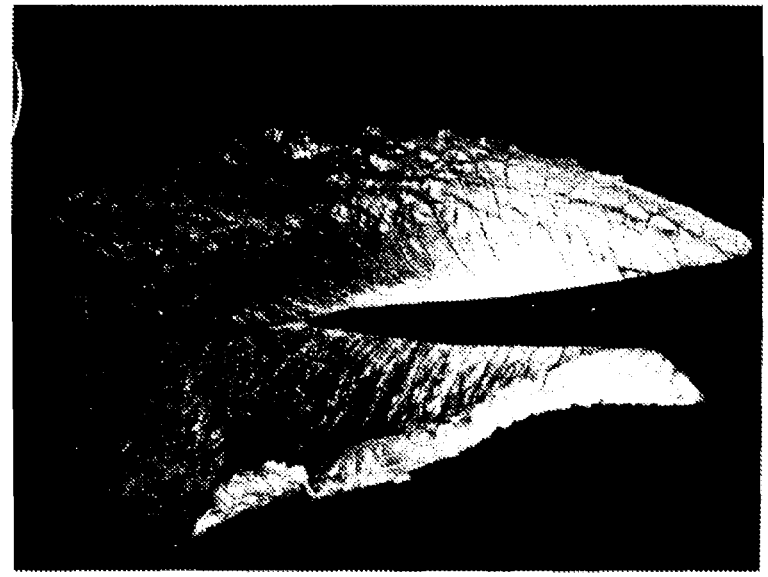
FIG. 9B depicts a Romaine lettuce leaf after removal of the mid-rib.

Any leaves that had visible damage were discarded. For the lettuce (FIG. 9A), the mid-rib of the leaf was removed (FIG. 9B). This was done to ensure the same leaf tissue was used to reduce the variability between samples. The leaves were then cut into 2.5×1.5 inch pieces using a sterile razor blade.

For each trial a total of 6 replicates were used. After exposing the leaf samples to a given treatment, the samples were immediately placed in 100 ml of sterile 0.1M phosphate buffer, pH 7.0.

A no treatment control sample was also performed where the samples were treated exactly the same as the treatment samples, except that they were not exposed to any of the sanitizers. For each trial 5 replicates of the no treatment controls were used. These controls were used to calculate the average log unit reduction of the sanitization treatments.

Each sample was then blended for 2 minutes using a blender. Between each sample, the blending jars were washed with 95% ethanol and rinsed with sterile water. A blender that has blending jars for smaller volumes (such as for smoothies) works well for this application.

The samples are then serially diluted and plated on appropriate media, such as LB or Total Plate Count Agar, and then incubated as required.

The average (i.e., mean) CFU/ml, together with the standard error of the mean, was then calculated for each treatment and no treatment control sample. The mean log unit reduction values were then calculated by dividing the mean for the no treatment control by the mean value for each treatment and taking the log 10 of the result. Standard errors for the log reduction values were calculated using propagation of error formulas.

Bacteria

Cultures of *E. coli* O157:H7, *Salmonella Typhimurium*, and *Listeria monocytogenes* were grown overnight at 37° C. The growth media was removed by washing the cultures 3 times and resuspending the final pellet in an equal volume of phosphate-buffered saline (PBS).

Triple Wash Solution Preparation and Dipping Procedure

The 25 ppm $ClO_2$, 40 ppm $Cl_2$, and 80 ppm PAA triple wash solutions at the listed target concentrations were prepared as described in Example 1 above. The triple wash dipping procedure was performed as described in Example 1 above.

Analysis of Inoculation with Human Bacterial Pathogens

Overnight cultures of *E. coli* 0157:H7, *Salmonella Typhimurium*, and *Listeria monocytogenes* were grown from freezer stocks (glycerol or DMSO) in 20 ml of Luria Bertani broth (LB growing medium) with shaking at 150 rpm at 37° C.

The cultures were then centrifuged for 6 minutes at 3,000 rpm. The supernatant was then removed from the tubes and each pellet was resuspended in 20 ml (equal volume) of 0.1 M phosphate buffer, pH 7.0. This step was then repeated 2 times for a total of 3 wash steps to remove all growing medium from the culture.

Leaf samples were then prepared as described above. The leaf pieces were inoculated by spotting 200 μL of the washed culture on the surface of the leaf section. Each inoculum contained approximately $1 \times 10^6$ bacteria. The inoculation was repeated for 5 leaf sections (5 replicated for each treatment).

The leaves were then incubated for 1.5 hours at 24° C. in an incubator containing Drierite™. Initially, the top surface of 3 leaves and bottom surface of 2 leaves was spotted to determine whether there were differences in efficacy of each treatment between leaf surfaces. Once it was determined that no differences were observed, only the top surface of leaf samples was subsequently used.

After inoculation, each leaf sample was treated with the triple wash treatment ($ClO_2$, $Cl_2$, and PAA) and control treatments.

Following each treatment, the leaf samples were sampled and the average log unit reduction was calculated for each sample.

Results

Efficacy of Triple Wash Treatment with Romaine Lettuce at Room Temperature

Triple wash treatment was performed at room temperature (75° F.) with fresh Romaine lettuce samples that were inoculated with each of *E. coli* O157:H7, *Salmonella Typhimurium*, and *Listeria monocytogenes*. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, *Salmonella Typhimurium*, and *Listeria monocytogenes* was calculated after treatment.

The results are summarized in Tables 4-6.

TABLE 4

| Sample Treatment | Avg. *E. coli* Load | Std. Dev. of *E. coli* Load | Avg. LB Load | Std. Dev. of LB |
|---|---|---|---|---|
| No treatment | $1.76 \times 10^6$ | $1.95 \times 10^5$ | $2.30 \times 10^6$ | $3.54 \times 10^5$ |
| Triple wash | $1.14 \times 10^3$ | $1.72 \times 10^3$ | $1.27 \times 10^3$ | $1.72 \times 10^3$ |

The results in Table 4 indicate that the triple dip treatment resulted in a 3.19 log unit reduction in *E. coli* O157:H7 load. The triple wash treatment also resulted in a 3.26 log unit reduction in the background bacterial load (LB load).

TABLE 5

| Sample Treatment | Avg. *Salmonella* Load | Std. Dev. of *Salmonella* Load | Avg. LB Load | Std. Dev. of LB |
|---|---|---|---|---|
| No treatment | $2.68 \times 10^6$ | $2.86 \times 10^5$ | $3.52 \times 10^6$ | $1.92 \times 10^5$ |
| Triple wash | $6.27 \times 10^3$ | $1.16 \times 10^4$ | $6.38 \times 10^3$ | $1.16 \times 10^4$ |

The results in Table 5 indicate that the triple dip treatment resulted in a 2.63 log unit reduction in *Salmonella Typhimurium* load. The triple wash treatment also resulted in a 2.74 log unit reduction in the background bacterial load (LB load).

TABLE 6

| Sample Treatment | Avg. *Listeria* Load | Std. Dev. of *Listeria* Load | Avg. LB Load | Std. Dev. of LB |
|---|---|---|---|---|
| No treatment | $1.56 \times 10^5$ | $4.93 \times 10^4$ | $2.28 \times 10^6$ | $2.05 \times 10^5$ |
| Triple wash | $6.40 \times 10^2$ | $1.32 \times 10^3$ | $8.72 \times 10^3$ | $1.75 \times 10^4$ |

The results in Table 6 indicate that the triple dip treatment resulted in a 2.39 log unit reduction in *Listeria monocytogenes* load. The triple wash treatment also resulted in a 2.42 log unit reduction in the background bacterial load (LB load).

Efficacy of Triple Wash Treatment with Romaine Lettuce at Cold Temperature

Triple wash treatment was performed at 35° F. with fresh Romaine lettuce samples that were inoculated with each of *E. coli* O157:H7, *Salmonella Typhimurium*, and *Listeria monocytogenes*. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, *Salmonella Typhimurium*, and *Listeria monocytogenes* was calculated after treatment.

The results are summarized in Tables 7-9.

TABLE 7

| Sample Treatment | Avg. *E. coli* Load | Std. Dev. of *E. coli* Load | Avg. LB Load | Std. Dev. of LB |
|---|---|---|---|---|
| No treatment | $2.30 \times 10^6$ | $2.83 \times 10^5$ | $3.86 \times 10^6$ | $1.21 \times 10^5$ |
| Triple wash | $9.66 \times 10^2$ | $1.66 \times 10^3$ | $1.22 \times 10^3$ | $1.57 \times 10^3$ |

The results in Table 7 indicate that the triple dip treatment resulted in a 3.38 log unit reduction in *E. coli* O157:H7 load. The triple wash treatment also resulted in a 3.50 log unit reduction in the background bacterial load (LB load).

TABLE 8

| Sample Treatment | Avg. *Salmonella* Load | Std. Dev. of *Salmonella* Load | Avg. LB Load | Std. Dev. of LB |
|---|---|---|---|---|
| No treatment | $4.24 \times 10^6$ | $3.85 \times 10^5$ | $5.36 \times 10^6$ | $1.71 \times 10^6$ |
| Triple wash | $2.08 \times 10^3$ | $2.66 \times 10^3$ | $1.18 \times 10^4$ | $2.21 \times 10^4$ |

The results in Table 8 indicate that the triple dip treatment resulted in a 3.31 log unit reduction in *Salmonella Typhimurium* load. The triple wash treatment also resulted in a 2.66 log unit reduction in the background bacterial load (LB load).

TABLE 9

| Sample Treatment | Avg. *Listeria* Load | Std. Dev. of *Listeria* Load | Avg. LB Load | Std. Dev. of LB |
|---|---|---|---|---|
| No treatment | $3.70 \times 10^5$ | $2.43 \times 10^5$ | $2.60 \times 10^6$ | $4.30 \times 10^5$ |
| Triple wash | $1.46 \times 10^2$ | $1.48 \times 10^2$ | $1.75 \times 10^3$ | $2.00 \times 10^3$ |

The results in Table 9 indicate that the triple dip treatment resulted in a 3.40 log unit reduction in *Listeria monocytogenes* load. The triple wash treatment also resulted in a 3.17 log unit reduction in the background bacterial load (LB load).

Efficacy of Triple Wash Treatment with Romaine Lettuce Inoculated with a Mixed Culture Fresh Romaine lettuce samples were inoculated with a mixture of *E. coli* O157:H7, *Salmonella Typhimurium*, and *Listeria monocytogenes*. The inoculated lettuce was then treated with the triple wash treatment at 35° F. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, *Salmonella Typhimurium*, and *Listeria monocytogenes* was calculated after treatment.

The results are summarized in Tables 10-13.

TABLE 10

| Sample Treatment | Avg. E. coli Load | Std. Dev. of E. coli Load |
|---|---|---|
| No treatment | $9.74 \times 10^5$ | $4.29 \times 10^5$ |
| Triple wash | $8.00 \times 10^1$ | $1.57 \times 10^2$ |

The results in Table 10 indicate that the triple dip treatment resulted in a 4.09 log unit reduction in E. coli O157:H7 load.

TABLE 11

| Sample Treatment | Avg. Salmonella Load | Std. Dev. of Salmonella Load |
|---|---|---|
| No treatment | $1.52 \times 10^6$ | $2.49 \times 10^5$ |
| Triple wash | $5.60 \times 10^1$ | $1.20 \times 10^2$ |

The results in Table 11 indicate that the triple dip treatment resulted in a 4.43 log unit reduction in Salmonella Typhimurium load.

TABLE 12

| Sample Treatment | Avg. Listeria Load | Std. Dev. of Listeria Load |
|---|---|---|
| No treatment | $1.300 \times 10^5$ | $3.54 \times 10^4$ |
| Triple wash | $6.00 \times 10^0$ | $1.34 \times 10^1$ |

The results in Table 12 indicate that the triple dip treatment resulted in a 4.34 log unit reduction in Listeria monocytogenes load.

TABLE 13

| Sample Treatment | Avg. LB Load | Std. Dev. of LB Load |
|---|---|---|
| No treatment | $2.88 \times 10^6$ | $2.68 \times 10^5$ |
| Triple wash | $1.74 \times 10^2$ | $1.85 \times 10^2$ |

The results in Table 13 indicate that the triple dip treatment resulted in a 4.22 log unit reduction in the background bacterial load (LB load).

Efficacy of Triple Wash Treatment for Reducing Listeria Load

Fresh Romaine lettuce samples were inoculated with Listeria, and then treated with the triple wash treatment. The triple wash dips were completed as follows: a) 10 s dip in 25 ppm $ClO_2$; b) 90 s dip in 40 ppm $Cl_2$; and c) 30 s dip in 80 ppm PAA. The average bacterial load in log units was calculated after triple wash treatment. Additionally, the Listeria load as a percentage of the total bacterial load was calculated after triple wash treatment, or after each dip of the triple wash treatment.

The results are depicted in Table 14.

TABLE 14

| Sample Treatment | Avg. Bacterial Load | Listeria Load (%) |
|---|---|---|
| No treatment | 1.25 | 2.5% |
| Triple wash | 0.1 | 0.0% |

As shown in Table 14, the triple wash treatment resulted in a significant decrease in bacterial load, and the complete elimination of Listeria.

Efficacy of Triple Wash Treatment Dip Order for Reducing Listeria Load

Fresh Romaine lettuce samples were inoculated with Listeria, and then treated with the triple wash treatment. For Treatment 1, the triple wash dips were completed as follows: a) 10 s dip in 25 ppm $ClO_2$; b) 90 s dip in 40 ppm $Cl_2$; and c) 30 s dip in 80 ppm PAA.

For Treatment 2, the triple wash dips were completed as follows: a) 10 s dip in 25 ppm $ClO_2$; b) 90 s dip in 80 ppm PAA; and c) 30 s dip in 40 ppm $Cl_2$.

The average bacterial load in log units was calculated after triple wash treatment, or after each dip of the triple wash treatment. Additionally, the Listeria load as a percentage of the total bacterial load was calculated after triple wash treatment, or after each dip of the triple wash treatment.

The results are depicted in Tables 15 and 16.

TABLE 15

| Treatment 1 | Avg. Bacterial Load | Listeria Load (%) |
|---|---|---|
| No treatment | 4.81 | 16.33% |
| ClO2 dip | 1.56 | 2.87% |
| ClO2 + Cl2 dip | 0.65 | 0.82% |
| Triple dip | 0.35 | 0.65% |

TABLE 16

| Treatment 2 | Avg. Bacterial Load | Listeria Load (%) |
|---|---|---|
| No treatment | 4.81 | 16.33% |
| ClO2 dip | 2.41 | 4.29% |
| ClO2 + PAA dip | 0.33 | 7.53% |
| Triple dip | 0.08 | 0.51% |

As shown in Tables 15 and 16, the triple Treatments 1 and 2 resulted in a significant reduction in bacterial load, and almost complete elimination of Listeria. The results also indicate that addition of each sanitizer solution in the triple wash treatment results in a synergistic decrease in bacterial load, as the bacterial load decreased after each dip for both Treatment 1 and Treatment 2.

Example 3

Efficacy of Triple Wash Treatment for Sanitizing Leafy Greens Under Commercial Processing Conditions Introduction The following Example demonstrates the efficacy of a triple wash treatment utilizing a chlorine dioxide ($ClO_2$) solution, a chlorine solution ($Cl_2$), and a peroxyacetic acid solution (PAA) in sanitizing (i.e., reducing microbial load) in lettuce using a processing wash line under commercial processing plant conditions.

Materials and Methods

Processing Apparatus

Figure 10:
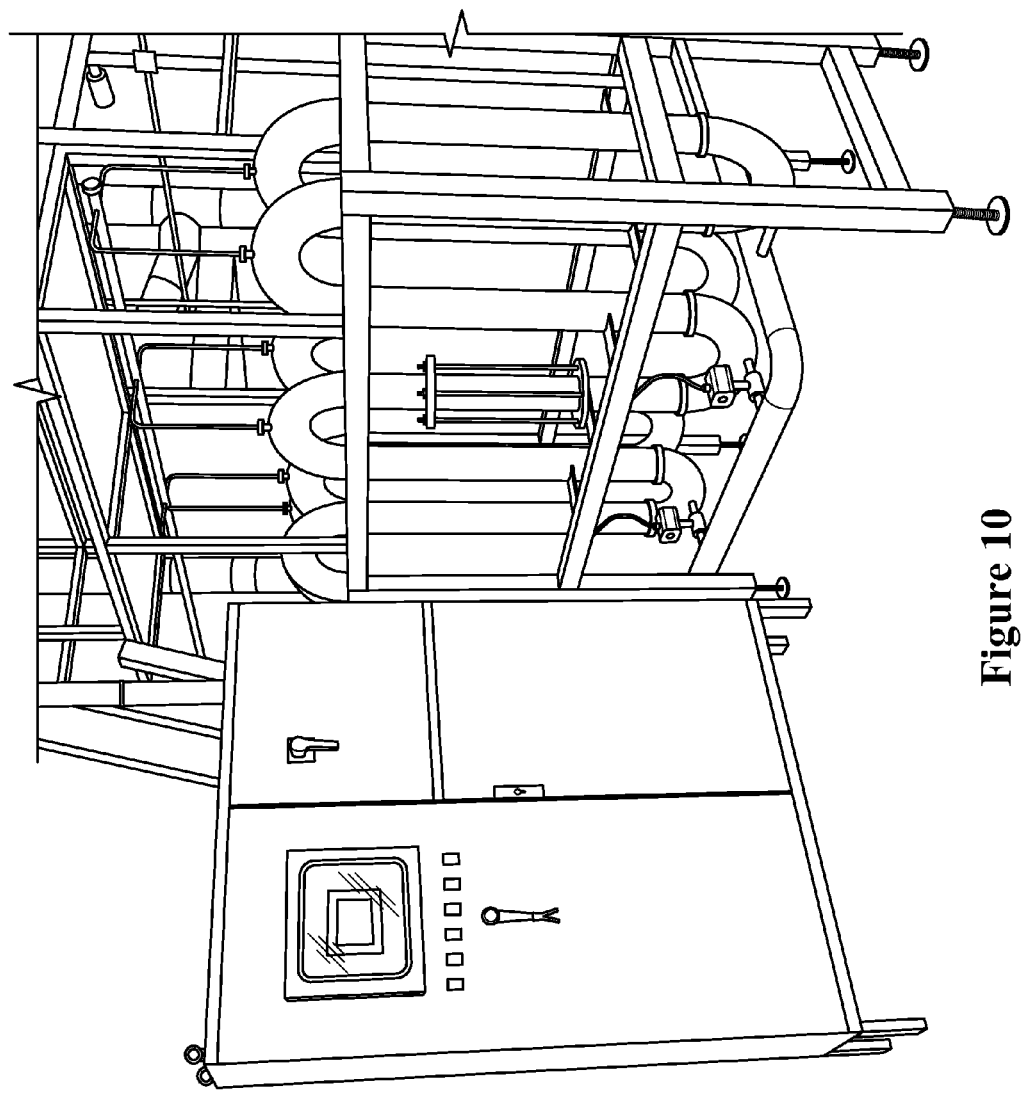
FIG. 10 depicts a sanitizing treatment apparatus.

Chopped Romaine lettuce was processed and treated with the triple wash treatment using a similar apparatus as to that shown in FIG. 10.

The apparatus has the ability to completely submerge the chopped lettuce for overall and uniform treatment exposure, and to convey the lettuce with precise time of treatment. Residence time in the apparatus was controlled by controlling the speed of the water pump motor that is responsible for conveying the water and submerged product through the device. The apparatus has an inlet hopper where the lettuce was fed into via a belt conveyor. Sanitizing water enters the hopper along with the product. At the end of the apparatus, lettuce submerged in water exited onto a perforated belt, which allowed the water to go through and collect in a catch tank, while conveying the dewatered lettuce into a bin. Sanitizing solutions (i.e., $ClO_2$, $Cl_2$, and PAA) were injected into the apparatus just below the inlet hopper.

Lettuce Preparation

Cooled Whole Head Romaine after trimming and cutting was chopped and then fed continuously into the apparatus at a feed rate of approximately 1000 lbs/hr.

Triple Wash Solution Preparation and Treatment Procedure

The triple wash treatment solutions were chlorine dioxide ($ClO_2$), chlorine ($Cl_2$), and peroxyacetic acid (PAA). The $Cl_2$ and PAA solutions were prepared as described in Example 1 above. Citric acid concentrate was used to adjust pH of the chlorinated wash to the desired range. The chlorine dioxide solution was produced using a 3 chemical on site generation system. This solution was prepared by diluting concentrate solutions of $ClO_2$. The concentrate solutions of $ClO_2$ were generated using a 3 chemical $ClO_2$ generator. Sodium chlorite, hydrochloric acid, and sodium hypochlorous acid were used to generate the concentrate solutions of $ClO_2$. The Aqua-Pulse Systems APS-3T-30 was used to generate 2000-6000 ppm concentrate $ClO_2$ solution. The $ClO_2$ concentration of the final working solution was confirmed using an HACH Spectrophotomer DR 2800 (program 76).

For the triple wash treatment, each washing step was conducted individually in the same apparatus in sequence. After each washing step, the remaining wash water in the treatment apparatus and the collection wash tank was changed and refilled with the sanitizer solutions required for the next step.

The three sequential sanitizing treatments provided were: 1) $ClO_2+Cl_2$ solutions for 30 seconds; 2) $Cl_2+ClO_2$ solutions for 30 seconds; and 3) PAA for 30 seconds.

The individual concentrations for each solution were monitored during the run and are listed in Table 17.

TABLE 17

| Treatment 1, 30 sec. | Treatment 2, 30 sec. | Treatment 3, 30 sec. |
|---|---|---|
| Chlorine dioxide<br>Average = 5.27 ppm<br>Range = 3-7 ppm | Chlorine (total free chlorine)<br>Average = 30.8 ppm<br>Range = 15-50 ppm<br>pH < 6.8 | PAA<br>Average = 38 ppm<br>Range = 20-60 ppm |
| Chlorine (total free chlorine)<br>Average = 30.8 ppm<br>Range = 15-50 ppm<br>pH < 6.8 | Chlorine dioxide<br>Average = 5.27 ppm<br>Range = 3-7 ppm | |

In Table 17, Treatment 1 corresponds to $ClO_2+Cl_2$ solutions for 30 seconds; Treatment 2 corresponds to $Cl_2+ClO_2$ solutions for 30 seconds; and Treatment 3 corresponds to PAA for 30 seconds. Chlorine concentration is given as concentration of total free chlorine.

A processing plant control utilizing a three step chlorinated wash system was also used as a processing plant control.

Microbial Load Analysis

Microbial load analysis was performed for lettuce samples both before and after each wash treatment step. Microbial load analysis was performed by APC testing as described in Example 1 above.

The control used for microbial load reduction comparison was raw (i.e., unwashed) chopped Romaine lettuce that was obtained from the manufacturing plant on the day of treatment on an existing wash line, with samples taken before and after the existing washing/sanitizing steps. The control lettuce was from the same batch of raw material as used in this trial.

Results

Figure 11:
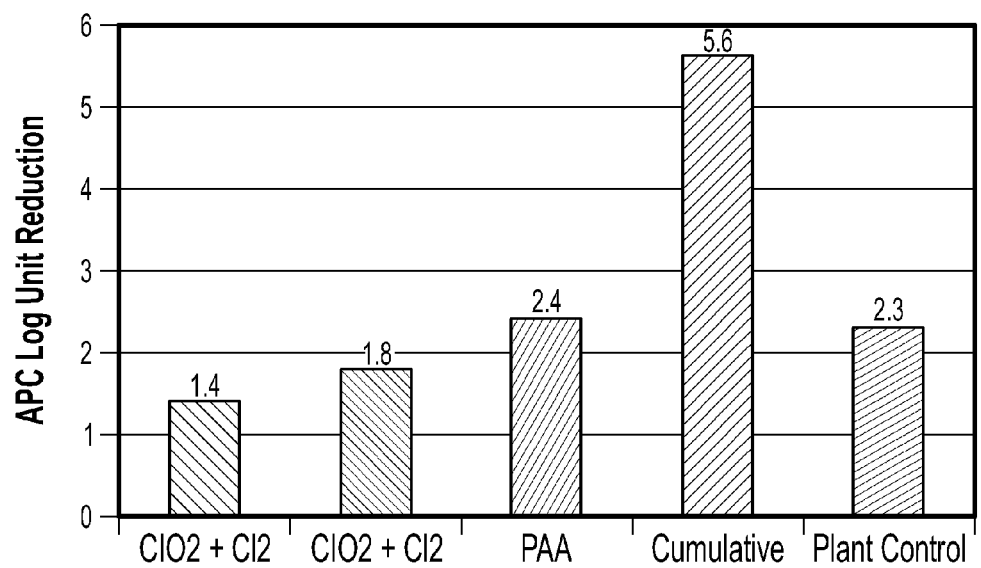
FIG. 11 is a bar graph depicting average Aerobic Plate Count (APC) log unit reduction on chopped Romaine lettuce from a triple wash system. The triple wash system includes 3 wash treatments. Treatment 1 includes washing with $ClO_2$ and $Cl_2$, Treatment 2 includes washing with $ClO_2$ and $Cl_2$, and Treatment 3 includes washing with PAA. The "Plant Control" refers to a Trim Line 7: Cl2 control.

FIG. 11 depicts the results from a trial with lettuce samples processed through a processing wash line. In particular, FIG. 11 shows the average log unit reduction in microbial load associated with each wash step and a cumulative representation from all 3 steps, as compared to the raw control.

The results indicate that the processing plant control (Plant Control) yielded a 2.3 log unit reduction in microbial load from the unwashed to washed lettuce (FIG. 11). However, the triple wash treatment yielded a cumulative 5.6 log unit reduction in microbial load from the unwashed to the final washed lettuce (FIG. 11). The results show that the triple wash treatment results in an additional 3 log unit reduction in microbial load as compared to the plant control treatment. This indicates that the triple wash treatment is significantly more effective than the triple chlorine treatment of the plant processing control.

Additionally, the results in FIG. 11 show that the Treatment 1 wash ($ClO_2+Cl_2$) yields a 1.4 log unit reduction in microbial load, that the Treatment 2 wash ($Cl_2+ClO_2$) yields a 1.8 log unit reduction in microbial load; and that the Treatment 3 wash (PAA) yields a 2.4 log unit reduction in microbial load. These results represent microbial load reductions after each individual step. It should be noted Treatment 1 and Treatment 2 represent a mixture of chlorine dioxide ($ClO_2$) and chlorine ($Cl_2$).

The results from FIG. 11 also demonstrate that the sanitizers $ClO_2$, $Cl_2$, and PAA act synergistically to yield a log unit reduction in microbial load that is significantly better than that seen with the triple chlorine treatment.

Example 4

Effects of Temperature and Treatment Duration on Sanitizer Efficacy Against Pathogenic Bacterial Suspensions Introduction The following Example demonstrates the temperatures at which chlorine and chlorine dioxide sanitizer treatments effectively reduce the microbial load of pathogenic bacterial suspensions. The Example also demonstrates the effects treatment duration on reducing the microbial load of pathogenic bacterial suspensions.

Materials and Methods

Suspension Tests

Cultures of *E. coli* O157:H7, *Salmonella Typhimurium*, and *Listeria monocytogenes* were grown overnight at 37° C. with shaking at 150 rpm from 7% dimethyl sulfoxide freezer stocks stored at −80° C. The growing media (Luria Bertani broth for *E. coli* and *Salmonella*; brain heart infusion broth for *Listeria*) was removed by washing the cultures 3 times at 3,000 rpm and resuspending the final pellet in an equal volume of 0.1 M phosphate buffer, pH 7.0. The mixed culture was prepared by adding equal volumes of each strain and vortexed to ensure mixing. For the suspension tests, 0.1 ml of the mixed culture was added to 0.9 ml of the treatment solution at the appropriate concentration and temperature. Controls were performed for each culture by adding 0.9 ml of water instead of the sanitizer. After 30 or 90 seconds of contact, 0.1 ml of the sanitizer/bacteria mixture was removed and immediately diluted 100-fold in 0.1 M phosphate buffer, pH 7.0 (this neutralizes the disinfectant). The samples were serially diluted and plated on selective agars to enumerate each bacterial species and a non-selective agar to enumerate total load of a mixed culture of all species. All of the suspension tests were carried out using a total of 5 replicates. Disinfectant activity was determined for each treatment by comparing the growth on the control and treatment plates and calculating the average log reduction in CFU/ml and percentage of bacteria killed by disinfectant.

Results

TABLE 18

Suspension tests conducted for 30 seconds at 4° C.

| | | Bacteria | | | |
|---|---|---|---|---|---|
| Treatment | Measurement | Non-selective mix | E. coli O157:H7 | Salmonella Typhimurium | Listeria monocytogenes |
| Water | Average | $1.00 \times 10^7$ | $5.72 \times 10^6$ | $5.32 \times 10^6$ | $4.96 \times 10^5$ |
| | Standard Deviation | $1.54 \times 10^6$ | $4.85 \times 10^5$ | $6.52 \times 10^5$ | $3.03 \times 10^5$ |
| Chlorine (40 ppm, pH 6.0) | Average | $3.25 \times 10^3$ | 0.00 | 0.00 | 0.00 |
| | Standard Deviation | $4.12 \times 10^3$ | 0.00 | 0.00 | 0.00 |
| | Average log reduction | 3.49 | * | * | * |
| | % bacteria killed | 99.968% | 100% | 100% | 100% |
| Chlorine dioxide (10 ppm) | Average | 0.00 | 0.00 | 0.00 | 0.00 |
| | Standard Deviation | 0.00 | 0.00 | 0.00 | 0.00 |
| | Average log reduction | * | * | * | * |
| | % bacteria killed | 100% | 100% | 100% | 100% |

* indicates a sample in which no bacteria grew, so no fold reduction may be calculated.

TABLE 19

Suspension tests conducted for 90 seconds at 4° C.

| | | Bacteria | | | |
|---|---|---|---|---|---|
| Treatment | Measurement | Non-selective mix | E. coli O157:H7 | Salmonella Typhimurium | Listeria monocytogenes |
| Water | Average | $6.22 \times 10^6$ | $3.96 \times 10^6$ | $1.57 \times 10^6$ | $2.06 \times 10^5$ |
| | Standard Deviation | $1.10 \times 10^6$ | $6.44 \times 10^5$ | $1.13 \times 10^6$ | $3.38 \times 10^4$ |
| Chlorine (40 ppm, pH 6.0) | Average | $2.50 \times 10^2$ | 0.00 | 0.00 | 0.00 |
| | Standard Deviation | $3.94 \times 10^2$ | 0.00 | 0.00 | 0.00 |
| | Average log reduction | 4.40 | * | * | * |
| | % bacteria killed | 99.996% | 100% | 100% | 100% |
| Chlorine dioxide (10 ppm) | Average | $2.00 \times 10^0$ | 0.00 | 0.00 | 0.00 |
| | Standard Deviation | $4.47 \times 10^0$ | 0.00 | 0.00 | 0.00 |
| | Average log reduction | 6.49 | * | * | * |
| | % bacteria killed | 99.99997% | 100% | 100% | 100% |

* indicates a sample in which no bacteria grew, so no fold reduction may be calculated.

TABLE 20

Suspension tests conducted for 30 seconds at 15° C.

| | | Bacteria | | | |
|---|---|---|---|---|---|
| Treatment | Measurement | Non-selective mix | E. coli O157:H7 | Salmonella Typhimurium | Listeria monocytogenes |
| Water | Average | $8.46 \times 10^6$ | $5.96 \times 10^6$ | $2.70 \times 10^6$ | $2.24 \times 10^6$ |
| | Standard Deviation | $1.69 \times 10^6$ | $8.14 \times 10^5$ | $8.99 \times 10^5$ | $4.08 \times 10^5$ |
| Chlorine (40 ppm, pH 6.0) | Average | $4.00 \times 10^0$ | 0.00 | 0.00 | 0.00 |
| | Standard Deviation | $8.94 \times 10^0$ | 0.00 | 0.00 | 0.00 |
| | Average log reduction | 6.33 | * | * | * |
| | % bacteria killed | 99.99995% | 100% | 100% | 100% |

TABLE 20-continued

Suspension tests conducted for 30 seconds at 15° C.

| Treatment | Measurement | Bacteria | | | |
|---|---|---|---|---|---|
| | | Non-selective mix | E. coli O157:H7 | Salmonella Typhimurium | Listeria monocytogenes |
| Chlorine dioxide (10 ppm) | Average | 0.00 | 0.00 | 0.00 | 0.00 |
| | Standard Deviation | 0.00 | 0.00 | 0.00 | 0.00 |
| | Average log reduction | * | * | * | * |
| | % bacteria killed | 100% | 100% | 100% | 100% |

* indicates a sample in which no bacteria grew, so no fold reduction may be calculated.

TABLE 21

Suspension tests conducted for 90 seconds at 15° C.

| Treatment | Measurement | Bacteria | | | |
|---|---|---|---|---|---|
| | | Non-selective mix | E. coli O157:H7 | Salmonella Typhimurium | Listeria monocytogenes |
| Water | Average | $1.21 \times 10^7$ | $5.74 \times 10^6$ | $4.54 \times 10^6$ | $7.14 \times 10^4$ |
| | Standard Deviation | $2.30 \times 10^6$ | $5.43 \times 10^5$ | $5.54 \times 10^5$ | $6.43 \times 10^4$ |
| Chlorine (40 ppm, pH 6.0) | Average | $8.00 \times 10^0$ | 0.00 | 0.00 | $2.00 \times 10^0$ |
| | Standard Deviation | $1.79 \times 10^1$ | 0.00 | 0.00 | $4.47 \times 10^0$ |
| | Average log reduction | 6.18 | * | * | 4.55 |
| | % bacteria killed | 99.99993% | 100% | 100% | 99.997% |
| Chlorine dioxide (10 ppm) | Average | $2.00 \times 10^1$ | 0.00 | 0.00 | 0.00 |
| | Standard Deviation | $4.47 \times 10^1$ | 0.00 | 0.00 | 0.00 |
| | Average log reduction | 5.78 | * | * | * |
| | % bacteria killed | 99.9998% | 100% | 100% | 100% |

* indicates a sample in which no bacteria grew, so no fold reduction may be calculated.

TABLE 22

Suspension tests conducted for 30 seconds at 40° C.

| Treatment | Measurement | Bacteria | | | |
|---|---|---|---|---|---|
| | | Non-selective mix | E. coli O157:H7 | Salmonella Typhimurium | Listeria monocytogenes |
| Water | Average | $8.30 \times 10^6$ | $3.22 \times 10^6$ | $4.36 \times 10^6$ | $2.32 \times 10^6$ |
| | Standard Deviation | $4.64 \times 10^5$ | $2.79 \times 10^5$ | $3.14 \times 10^5$ | $6.05 \times 10^5$ |
| Chlorine (40 ppm, pH 6.0) | Average | $2.00 \times 10^0$ | 0.00 | 0.00 | 0.00 |
| | Standard Deviation | $4.47 \times 10^0$ | 0.00 | 0.00 | 0.00 |
| | Average log reduction | 6.62 | * | * | * |
| | % bacteria killed | 99.99998% | 100% | 100% | 100% |
| Chlorine dioxide (10 ppm) | Average | $1.00 \times 10^2$ | $2.20 \times 10^1$ | $2.20 \times 10^1$ | $2.00 \times 10^0$ |
| | Standard Deviation | $6.16 \times 10^1$ | $4.38 \times 10^1$ | $4.38 \times 10^1$ | $4.47 \times 10^0$ |
| | Average log reduction | 4.92 | 5.17 | 5.30 | 6.06 |
| | % bacteria killed | 99.9988% | 99.9993% | 99.9995% | 99.9999% |

* indicates a sample in which no bacteria grew, so no fold reduction may be calculated.

TABLE 23

Suspension tests conducted for 90 seconds at 40° C.

| Treatment | Measurement | Bacteria | | | |
|---|---|---|---|---|---|
| | | Non-selective mix | E. coli O157:H7 | Salmonella Typhimurium | Listeria monocytogenes |
| Water | Average | $9.76 \times 10^6$ | $3.14 \times 10^6$ | $7.42 \times 10^6$ | $2.50 \times 10^6$ |
| | Standard Deviation | $4.04 \times 10^5$ | $2.42 \times 10^5$ | $1.05 \times 10^6$ | $2.28 \times 10^5$ |
| Chlorine (40 ppm, pH 6.0) | Average | $1.60 \times 10^1$ | 0.00 | 0.00 | 0.00 |
| | Standard Deviation | $2.19 \times 10^1$ | 0.00 | 0.00 | 0.00 |
| | Average log reduction | 5.79 | * | * | * |
| | % bacteria killed | 99.99984% | 100% | 100% | 100% |
| Chlorine dioxide (10 ppm) | Average | $7.20 \times 10^4$ | $2.80 \times 10^4$ | $3.80 \times 10^4$ | $9.80 \times 10^4$ |
| | Standard Deviation | $1.61 \times 10^5$ | $6.26 \times 10^4$ | $8.50 \times 10^4$ | $2.19 \times 10^5$ |
| | Average log reduction | 2.13 | 2.05 | 2.29 | 1.41 |
| | % bacteria killed | 99.2623% | 99.1083% | 99.4879% | 96.080% |

* indicates a sample in which no bacteria grew, so no fold reduction may be calculated.

TABLE 24

Summary of bacterial kill percentages from suspension tests (non-selected bacteria)

| Test condition | % bacteria killed, 40 ppm chlorine | % bacteria killed, 10 ppm chlorine dioxide |
|---|---|---|
| 4° C. for 30 seconds | 99.968 | 100 |
| 4° C. for 90 seconds | 99.996 | 99.99997 |
| 15° C. for 30 seconds | 99.99995 | 100 |
| 15° C. for 90 seconds | 99.99993 | 99.9998 |
| 40° C. for 30 seconds | 99.99998 | 99.9988 |
| 40° C. for 90 seconds | 99.99984 | 99.2623 |

Tables 18-23 show the results from the suspension tests for chlorine and chlorine dioxide treatment solutions. Quantification of bacterial load (expressed as averages with standard deviation) is indicated for each species (as well as for a mix of all three bacterial species). Furthermore, for each sanitizer treatment, the average log reduction in bacterial load and percentage of bacteria killed are given (relative to corresponding no-treatment control samples that were treated with only water at the appropriate temperature). Table 24 summarizes the percentage of bacteria (mix of all three bacterial species) killed after treatment with either 40 ppm chlorine or 10 ppm chlorine dioxide.

The results indicate that chlorine and chlorine dioxide have different effective temperature ranges. Chlorine is more effective at killing all three pathogens at a higher temperature. For example, 99.99998% of mixed bacteria are killed when treated at 40° C. for 30 seconds, as compared to only 99.9968% when treated at 4° C. for 30 seconds (Table 24). This is a difference of more than 3 log units. In contrast, chlorine dioxide is more effective at lower temperatures. For example, 100.000% of mixed bacteria are killed when treated at 4° C. or 15° C. for 30 seconds, as compared to only 99.9988% when treated at 40° C. for 30 seconds (Table 24). Similar results were also seen when treatment was prolonged to 90 seconds (Table 24). Without wishing to be bound by theory, it is believed that chlorine dioxide possesses greater chemical stability and solubility at lower temperatures. As such, it is believed that at lower temperatures, chlorine dioxide does not convert to chlorate and chlorite, which are not effective as disinfectants. It also believed that turbulence reduces the efficacy of chlorine dioxide, as chlorine dioxide is volatile and will breakdown to chlorate/chlorite when exposed to turbulence.

These results demonstrate that chlorine dioxide is more effective at reducing pathogenic microbial load when used at lower temperatures, such as 15° C. or 4° C.; and that chlorine is more effective at reducing pathogenic microbial load when used at high temperatures, such as 40° C.

Example 5

Effects of Mixing Chlorine and Chlorine Dioxide Treatments at Different Temperatures on Sanitizing Leafy Greens Inoculated with Pathogenic Bacteria Introduction The following Example describes the effects of combining chlorine and chlorine dioxide treatments in the second step of a triple wash system. The Example also assesses the effects of temperature on the combined treatments. The Example further describes the effects of directly dumping produce from the first treatment solution (chlorine) into the second solution (chlorine dioxide).

Materials and Methods

Mixed Chlorine and Chlorine Dioxide Treatments

Commodity Romaine lettuce was inoculated with human pathogens (E. coli O157:H7, Salmonella Typhimurium, and Listeria monocytogenes) as described in Example 2 above. The inoculation was repeated for 5 leaf sections (5 replicated for each treatment). The leaves were then incubated for 1.5 hours at room temperature.

Four variations on the triple wash procedure were carried out and compared to a chlorine-only control treatment. To distinguish the effects of temperature, treatments A and B were run together with a unique control, and C and D were run together with a unique control. The chlorine control treatments for both were completed as follows: a) 20 s dip at 4° C.; b) 90 s dip at 40° C.; and c) 30 s dip at 4° C. (all dips used 40 ppm $Cl_2$).

Treatment A was completed as follows: a) 20 s dip in 30 ppm $Cl_2$ at 16° C.; b) 90 s dip in 10 ppm $ClO_2$ at 40° C.; and c) 30 s dip in 60 ppm PAA at 4° C.

Treatment B was completed as follows: a) 20 s dip in 30 ppm $Cl_2$ at 16° C.; b) 90 s dip in a combination of both 10 ppm $ClO_2$ and 30 ppm $Cl_2$ at 40° C.; and c) 30 s dip in 60 ppm PAA at 4° C.

Treatment C was completed as follows: a) 20 s dip in 30 ppm $Cl_2$ at 16° C.; b) 90 s dip in 10 ppm $ClO_2$ at 16° C.; and c) 30 s dip in 60 ppm PAA at 4° C.

Treatment D was completed as follows: a) 20 s dip in 30 ppm $Cl_2$ at 16° C.; b) 90 s dip in combination of both 10 ppm $ClO_2$ and 30 ppm $Cl_2$ at 16° C.; and c) 30 s dip in 60 ppm PAA at 4° C.

Following each treatment, the leaf samples were sampled, serially diluted, and plated on selective agars to enumerate each bacterial species and a non-selective agar to enumerate total load of a mixed culture of all species. The average log unit reduction was calculated for each sample compared to the chlorine control.

Dumping Produce Directly from Chlorine to Chlorine Dioxide Treatments

Commodity Romaine lettuce was inoculated with human pathogens (*E. coli* O157:H7, *Salmonella Typhimurium*, and *Listeria monocytogenes*) as described in Example 2 above. The inoculation was repeated for 5 leaf sections (5 replicated for each treatment). The leaves were then incubated for 1.5 hours at room temperature.

The lettuce was incubated in 50 ppm $Cl_2$ for 20 s at 4° C., then dumped directly into 20 ppm $ClO_2$ to treat for 90 s at 4° C., and finally dipped in 60 ppm PAA for 30 s at 4° C. For control, chlorine-only treatment was carried out as follows: a) 20 s at 4° C.; b) 90 s dip at 4° C.; and c) 30 s dip at 4° C. (all dips used 40 ppm $Cl_2$).

Following each treatment, the leaf samples were sampled, serially diluted, and plated on selective agars to enumerate each bacterial species and a non-selective agar to enumerate total load of all species. The average log unit reduction was calculated for each sample compared to the chlorine control.

Results

Effect of Mixing Chlorine and Chlorine Dioxide Treatments at Different Temperatures on Reducing Pathogenic Bacterial Load Table 25 shows the results of 4 treatment procedures on reducing pathogenic bacterial load on lettuce as compared to chlorine-only controls. For each treatment, average log reduction in indicated bacterial load is given, compared to appropriate chlorine control. To assess the effect of mixing chlorine and chlorine dioxide in a single treatment, treatments A and B should be compared, and C and D should be compared.

In Table 25, "Std. Dev." refers to standard deviation; "Control 1" refers to the chlorine control used with Treatments A and B; and "Control 2" refers to the chlorine control used with Treatments C and D.

TABLE 26

| Bacteria | Treatment (avg. log reduction compared to control) | | | |
|---|---|---|---|---|
| | A | B | C | D |
| Non-selective mix | 1.26 | 0.72 | 0.46 | 0.05 |
| *E. coli* O157:H7 | −0.23 | −0.34 | 0.90 | 0.39 |
| *Salmonella Typhimurium* | 0.67 | 0.51 | 0.60 | 0.25 |
| *Listeria monocytogenes* | 0.76 | 0.23 | 0.37 | −0.05 |

Table 26 summarizes the results of Table 25, showing the reduction of pathogenic bacterial load on lettuce, as compared to the chlorine-only control, for each of the four treatments A-D. For each treatment, average log reduction in indicated bacterial load is given, compared to appropriate chlorine control. To assess the effect of mixing chlorine and chlorine dioxide in a single treatment, treatments A and B should be compared, and C and D should be compared.

The results indicate that mixing chlorine and chlorine dioxide in a second step after an initial chlorine wash step in a triple wash system is not very effective at reducing bacterial load (comparing Treatment A with B, and Treatment C with D). As shown in Tables 25 and 26, the results were similar regardless of the temperature at which this combined treatment step was performed (Treatments A and B were conducted at 40° C., while Treatments C and D were conducted at 16° C.). Without wishing to be bound by theory, it is believed that mixing of chlorine and chlorine dioxide breaks down the chlorine dioxide to chlorate and chlorite, which are not very effective disinfectants. The results were also consistent among all pathogen inoculants tested.

These results also demonstrate that performing the chlorine treatment step before the chlorine dioxide step is not as effective as performing the chlorine dioxide step first in the triple wash system (comparing the results depicted in Table 26 to those depicted in Tables 10-13).

TABLE 25

| Treatment | Measurement | Bacterial Inoculation | | | |
|---|---|---|---|---|---|
| | | Non-selective mix | *E. coli* | *Salmonella Typhimurium* | *Listeria monocytogenes* |
| Control 1 | Average | $1.01 \times 10^5$ | $6.42 \times 10^3$ | $3.76 \times 10^4$ | $1.48 \times 10^4$ |
| | Std. Dev. | $1.07 \times 10^5$ | $5.61 \times 10^3$ | $3.74 \times 10^4$ | $1.61 \times 10^4$ |
| A | Average | $5.51 \times 10^3$ | $1.10 \times 10^4$ | $8.10 \times 10^3$ | $2.55 \times 10^3$ |
| | Std. Dev. | $4.73 \times 10^3$ | $1.27 \times 10^4$ | $1.02 \times 10^4$ | $2.32 \times 10^3$ |
| B | Average | $1.94 \times 10^4$ | $1.42 \times 10^4$ | $1.16 \times 10^4$ | $8.62 \times 10^3$ |
| | Std. Dev. | $3.96 \times 10^4$ | $3.12 \times 10^4$ | $2.22 \times 10^4$ | $1.76 \times 10^4$ |
| Control 2 | Average | $8.77 \times 10^3$ | $3.54 \times 10^3$ | $5.10 \times 10^3$ | $2.86 \times 10^3$ |
| | Std. Dev. | $1.38 \times 10^4$ | $6.50 \times 10^3$ | $8.63 \times 10^3$ | $4.75 \times 10^3$ |
| C | Average | $3.02 \times 10^3$ | $4.48 \times 10^2$ | $1.28 \times 10^3$ | $1.22 \times 10^3$ |
| | Std. Dev. | $3.02 \times 10^3$ | $6.92 \times 10^2$ | $1.62 \times 10^3$ | $1.64 \times 10^3$ |
| D | Average | $7.73 \times 10^3$ | $1.45 \times 10^3$ | $2.88 \times 10^3$ | $3.23 \times 10^3$ |
| | Std. Dev. | $1.18 \times 10^4$ | $1.87 \times 10^3$ | $3.11 \times 10^3$ | $4.14 \times 10^3$ |

Effect of Dumping Produce from Chlorine into Chlorine Dioxide on Reducing Pathogenic Bacterial Load

TABLE 27

| Treatment | Measurement | Bacterial Inoculation | | |
|---|---|---|---|---|
| | | Non-selective mix | E. coli | Salmonella Typhimurium |
| Control | Average | $1.54 \times 10^2$ | $1.00 \times 10^2$ | $1.80 \times 10^1$ |
| | Std. Dev. | $2.04 \times 10^2$ | $1.46 \times 10^2$ | $2.39 \times 10^1$ |
| Dump treatment | Average | $7.60 \times 10^2$ | $2.42 \times 10^2$ | $1.84 \times 10^2$ |
| | Std. Dev. | $1.27 \times 10^3$ | $2.92 \times 10^2$ | $2.56 \times 10^2$ |

TABLE 28

| Bacteria | Average log reduction compared to control |
|---|---|
| Non-selective mix | −0.69 |
| E. coli | −0.38 |
| Salmonella Typhimurium | −1.01 |

Tables 27 shows the results of dumping lettuce inoculated with pathogenic bacteria directly from the chlorine treatment to the chlorine dioxide treatment. Table 28 summarizes the results, showing the reduction of pathogenic bacterial load on lettuce, as compared to a chlorine-only control.

The results indicate that directly dumping produce from a first-step chlorine solution into a second-step chlorine dioxide solution is note very effective at reducing microbial load, as the chlorine control yields a greater reduction in microbial load than the dump treatment (Table 28). Similar to the results of combined chlorine and chlorine dioxide treatments, dumping the produce directly from one treatment to the other results in mixing of the chlorine and chlorine dioxide solutions. Without wishing to be bound by theory, it is believed that such mixing leads to the break-down of chlorine dioxide, forming chlorate and chlorite. Without wishing to be bound by theory, it is thus believed that the each treatment should be conducted serially, without mixing chlorine and chlorine dioxide solutions. Preferably, it is believed that a de-watering step or section should be included between the chlorine and chlorine dioxide wash step in order to ensure that the chlorine solution does not mix with the chlorine dioxide solution.

The results thus demonstrate that combining chlorine and chlorine dioxide solutions in the second treatment step of the triple wash system, either directly by mixing or indirectly by dumping produce between solutions, reduces the efficacy of the chlorine dioxide solution, as compared to controls that only utilize single solutions.

Example 6

Efficacy of Various Triple Wash Treatments for Sanitizing Leafy Greens Under Laboratory or Commercial Processing Conditions Introduction The following Example describes the effects of utilizing either chlorine or a combination of chlorine and chlorine dioxide as the first treatment step in the combining chlorine and chlorine dioxide treatments in the second step of the triple wash system under commercial processing plant conditions.

Materials and Methods

Triple Wash Solution Preparation and Treatment Procedure

Treatment of lettuce under commercial processing plant conditions was performed as described in Example 3. The apparatus used was a larger scale commercial processing system as described in FIG. 1b, which includes 1 open flume, followed by 2 closed loop full immersion pipe loops. Chopped romaine for testing was fed into the system at a rate of 3000 to 5000 lb/hr. The triple wash treatment solutions were chlorine dioxide ($ClO_2$), chlorine ($Cl_2$), and peroxyacetic acid (PAA). For the triple wash treatment, each washing step led into the next washing step in series and in the sequence described. Since each washing step had its own collection tank, the sanitizing solutions were individually maintained. The individual concentrations for each solution were monitored during the run and are listed in FIG. 12

Treatment of lettuce under laboratory conditions was performed as described in Example 2.

Microbial Load Analysis

Microbial load analysis was performed for lettuce samples both before ("Initial Micro") and after (expressed as a reduction: "Micro Red") each wash treatment step. Microbial load analysis was performed by APC testing as described in Example 1. Initial and post-treatment microbial loads are given in log units. The differences between experimental and corresponding control microbial reductions are expressed as log units ("Micro Red to Control").

Results

FIG. 12 depicts the results of multiple trials showing the effectiveness of different triple wash procedures on reducing microbial load of leafy produce. Beginning at the left column, each date depicts a set of trials and their results undertaken on the given date. The trials are listed with treatments ("Treat 1," "Treat 2," etc.) grouped with corresponding chlorine-only controls ("Control" listed for each date). The triple wash procedure was either conducted under laboratory conditions ("Lab"), or commercial processing plant conditions ("Commercial"). For each experimental and control treatment, the temperature and sanitizing solution are described for each wash step. The three rightmost columns depict measurements of microbial load: an initial measurement ("Initial Micro"), the reduction in microbial load by each treatment given in log units ("Micro Red"), and the difference between microbial load reduction of each treatment and its corresponding control, given in log units ("Micro Red to Control").

As shown in FIG. 12, the largest reductions in microbial load over control treatment are observed when chlorine dioxide is used as the first step and chlorine is used as the second step (see Jan. 15, 2013 Treat 1; Jan. 15, 2013 Treat 3; and first Mar. 8, 2013 Treat 1, all in bold). This is consistent with the results shown in Examples 1 and 2. However, using chlorine first, or mixing the chlorine and chlorine dioxide solutions resulted in reduced efficacy (FIG. 12). FIG. 12 also demonstrates that utilizing the chlorine solution or a combination of the chlorine and chlorine dioxide solutions as the first wash step is not as effective under commercial processing plant conditions as utilizing the chlorine dioxide solution first under laboratory conditions (see, Example 3 and FIG. 11). Moreover, FIG. 12 shows that the higher temperatures under commercial processing plant conditions also reduced the efficacy of the chlorine dioxide solution.

As shown in FIG. 12, the largest reductions in microbial load over control treatment are observed when chlorine dioxide is used as the first step and chlorine is used as the second step (see Jan. 15, 2013 Treat 1; Jan. 15, 2013 Treat 3; and first Mar. 8, 2013 Treat 1, all in bold). This is consistent with the results shown in Examples 1 and 2. However, using chlorine first, or mixing the chlorine and chlorine dioxide solutions resulted in reduced efficacy (FIG. 12). FIG. 12 also demonstrates that utilizing the chlorine solution or a combination of the chlorine and chlorine dioxide solutions as the first wash step is not as effective under commercial processing plant conditions as utilizing the chlorine dioxide solution first as compared to Lab (see, Example 3 and FIG. 11)]. Moreover, FIG. 12 shows that the higher temperatures under commercial processing plant conditions also reduced the efficacy of the chlorine dioxide solution (see Mar. 24, 2013 Treat 1).

Looking at both the laboratory and commercial conditions, the results indicate that the order of the wash steps is important in effectively reducing bacterial load in produce, such as lettuce. In particular, the results show that using chlorine or a mixture of chlorine and chlorine dioxide as a first wash step is less effective than using chlorine dioxide as the first wash step. The results further indicate that mixing chlorine and chlorine dioxide in the second step is less effective than using chlorine alone.

What is claimed is:

1. A method for sanitizing produce, the method comprising:
   (a) treating the produce with a chlorine dioxide solution for a period of time sufficient to sanitize the produce;
   (b) treating the produce with a solution comprising free available chlorine for a period of time sufficient to sanitize the produce; and
   (c) treating the chlorine dioxide treated and chlorine treated produce with a solution comprising peroxyacetic acid for a period of time sufficient to further sanitize the produce,
   wherein treating with the chlorine dioxide solution, the solution comprising free available chlorine, and the solution comprising peroxyacetic acid yields at least an additional 1 log unit reduction in microbial load, as compared to produce treated with a single solution selected from the chlorine dioxide solution, the solution comprising free available chlorine, and the solution comprising peroxyacetic acid,
   wherein treating the produce with the chlorine dioxide solution and treating the produce with the solution comprising free available chlorine occur before treating the produce with the solution comprising peroxyacetic acid,
   wherein treating the produce with the solution comprising free available chlorine can occur before treating the produce with the chlorine dioxide solution,
   wherein treating with the solution comprising peroxyacetic acid reduces concentration of the chlorine dioxide solution, and wherein the concentration of the chlorine dioxide solution after treatment with the solution comprising peroxyacetic acid is less than 2 ppm.

2. The method of claim 1, wherein step (a) occurs prior to step (b).

3. The method of claim 1, wherein treating with the chlorine dioxide solution dissolves biofilm on the surface of the produce.

4. The method of claim 1, wherein treating with the chlorine dioxide solution, the solution comprising free available chlorine, and the solution comprising peroxyacetic acid yields an additional log unit reduction in microbial load that ranges from 1.5 to 6, as compared to produce treated with a single solution selected from the chlorine dioxide solution, the solution comprising free available chlorine, and the solution comprising peroxyacetic acid.

5. The method of claim 1, further comprising sonicating the produce before, concurrently, or after treating with the chlorine dioxide solution, the solution comprising free available chlorine, and/or the solution comprising peroxyacetic acid.

6. The method of claim 1, further comprising treating the produce with an electrolyzed ionic solution before, concurrently, or after treating with the chlorine dioxide solution, the solution comprising free available chlorine, and/or the solution comprising peroxyacetic acid.

7. The method of claim 1, further comprising treating the produce with potable water after treating with the chlorine dioxide solution, the solution comprising free available chlorine, and the solution comprising peroxyacetic acid.

8. The method of claim 1, wherein treating with the chlorine dioxide solution, the solution comprising free available chlorine, and the solution comprising peroxyacetic acid yields an increase in shelf-life of the produce, as compared to produce treated with a single solution selected from the chlorine dioxide solution, the solution comprising free available chlorine, and the solution comprising peroxyacetic acid.

9. The method of claim 1, wherein the produce is selected from the group consisting of a vegetable, a leafy vegetable, lettuce, spinach, a ground plant, sprouts, a squash, a melon, a gourd, a fruit, a berry, a nut, and any combination thereof.

10. The method of claim 1, wherein step (b) occurs prior to step (a).

11. The method of claim 1, wherein steps (a) and (b) occur concurrently.

12. A method for sanitizing produce, the method comprising:
   treating the produce with a chlorine dioxide solution to yield a chlorine dioxide treated produce;
   treating the chlorine dioxide treated produce with a solution comprising free available chlorine to yield a chlorine treated produce; and
   treating the chlorine treated produce with a solution comprising peroxyacetic acid to yield sanitized produce,
   wherein treating with the chlorine dioxide solution, the solution comprising free available chlorine, and the solution comprising peroxyacetic acid yields at least an additional 1 log unit reduction in microbial load, as compared to produce treated with a single solution selected from the chlorine dioxide solution, the solution comprising free available chlorine, and the solution comprising peroxyacetic acid,
   wherein treating the produce with the chlorine dioxide solution and treating the produce with the solution comprising free available chlorine occur before treating the produce with the solution comprising peroxyacetic acid,
   wherein treating with the solution comprising peroxyacetic acid reduces concentration of the chlorine dioxide solution, and wherein the concentration of the chlorine dioxide solution after treatment with the solution comprising peroxyacetic acid is less than 2 ppm.

* * * * *